United States Patent [19]

Hunter, Jr. et al.

[11] Patent Number: 5,523,543
[45] Date of Patent: Jun. 4, 1996

[54] LASER ABLATION CONTROL SYSTEM AND METHOD

[75] Inventors: Robert O. Hunter, Jr., Rancho Santa Fe; Bruce B. McArthur; Adlai H. Smith, both of San Diego, all of Calif.

[73] Assignee: Litel Instruments, San Diego, Calif.

[21] Appl. No.: 303,334

[22] Filed: Sep. 9, 1994

[51] Int. Cl.⁶ ........................................ B23K 26/04
[52] U.S. Cl. ............... 219/121.62; 219/121.71; 219/121.83; 364/474.08
[58] Field of Search ............... 219/121.7, 121.71, 219/121.62, 121.83, 121.73, 121.75; 364/474.08; 427/554, 555, 556, 597; 216/65

[56] References Cited

U.S. PATENT DOCUMENTS

| | | | |
|---|---|---|---|
| 4,734,558 | 3/1988 | Nakano et al. | 219/121.73 |
| 5,134,273 | 7/1992 | Wani et al. | 219/121.62 |
| 5,166,492 | 11/1992 | Rivera | 219/121.62 |
| 5,173,441 | 12/1992 | Yu et al. | 219/121.73 |
| 5,204,517 | 4/1993 | Cates et al. | 219/121.62 |
| 5,362,940 | 11/1994 | MacDonald et al. | 219/121.83 |
| 5,386,430 | 1/1995 | Yamagishi et al. | 219/121.71 |

*Primary Examiner*—Geoffrey S. Evans
*Attorney, Agent, or Firm*—Townsend and Townsend and Crew

[57] ABSTRACT

The laser ablation control system and method described is active in starting laser ablation, continuing laser ablation and finally tuning laser ablation in view of product output. First, it provides a means of generating initial settings for laser ablation tool operation utilizing the high predictability of ablation on substrates of known composition. Second, it provides real time monitoring and control of the laser output in terms of the characteristics important to the system performance as it relates to the abalation process. Third, it entails statistical analysis of the photo ablated pattern with correspondent adjustment to abalation parameters. Most importantly, these elements are continuously combined to achieve optimized performance monitored during the ablation process.

18 Claims, 15 Drawing Sheets

| | FUNCTION | DESCRIPTION | DATA PROCESSING |
|---|---|---|---|
| SYSTEM COMPONENT SENSORS | -DETAILED CHARACTERIZATION OF OPTICAL FIELD [I(x), φ(x), σ(x)] | 8 POINT WAVE FRONT AND ENERGY SENSING (HARTMANN-CCD SENSOR). QUAD CELL FAST CENTROID DETECTOR. | SHARED MICRO-PROCESSOR (REAL TIME). |
| PROCESS MODELING AND OPTIMIZATION ALGORITHM | -PROVIDE FEATURE DIMENSIONS AND STATISTICS AS A RELATED TO BEAM PARAMETERS, TOOL PARAMETERS, MATERIALS AND OPTICAL MASK TRANSFORM.<br><br>-INITIAL CONTROL SETTINGS AND OPTIMIZATION BY TOOL ADJUSTMENT FOR THROUGHPUT AND FEATURES. | SOFTWARE MODELING AND GENERATION OF FEATURES UTILIZING MASK OPTICAL AND ABLATION MODELS, TOOL DATA. COMPUTES FEATURE VALUES AS FUNCTION OF ALL CONTROL VARIABLES, GENERATES INFLUENCE FUNCTIONS, AND CHOOSES AND CORRECTS TOOL SETTINGS. | QUDRA OR EQUIVALENT. |
| TOOL CONTROLLER | -SEQUENCE AND SET OPERATING PARAMETERS FOR TOOL AND LASER. | SOFTWARE PROGRAM WITH PROVISION FOR INPUT OF ALL OPERATING PARAMETERS, SCORING DISPLAY. | PERFORMED IN LAB VIEW ON QUASAR |
| LASER CONTROL SUBSYSTEM | -KEEP POINTING AND COLLIMATION WITHIN CONTROL VALVES. | USES SYSTEM COMPONENT SENSOR DATA TO GENERATE FOCUS, POINTING CORRECTION ACTUATORS SIGNALS. | SHARED MICRO-PROCESSOR (REAL TIME). |
| IMMEDIATE INSPECTION | -IN SITU SAMPLING OF ABLATED FEATURES. | TOP MOUNTED SAMPLING SENSOR (CAMERA) AND MICROPROCESSOR. | IMAGE ACQUIRED AND PROCESSED SHARED MICROPROCESSOR. |

FIG. 7

LASER ABLATION CONTROL SYSTEM AND METHOD

A laser ablation control system and method for laser ablation control is disclosed in which initial operating settings are generated for beginning laser ablation, operating settings are continuously adjusted in "real time" to continue laser ablation, and finally measurement of the immediate ablated features is used to optimize the operating settings of the ablation parameters.

This application is a continuation-in-part of Ser. No. 08/215,851, filed Mar. 21, 1994 entitled Apparatus and Process for Optically Ablated Openings Having Designed Profile by the same inventors herein. In the following specification, the new material will be set forth first. This material illustrates the real time control of an ablating laser in producing openings in work pieces.

Thereafter, the subject matter of the above entitled application will be set forth in major portion. This material will illustrate the required fluence necessary to "predict" any hole shape to be ablated. It will be shown that by monitoring the intensity of the beam in real time and knowing the hole shape that the real time control required for the apparatus and system of this invention can be achieved.

BACKGROUND OF THE INVENTION

The use of lasers to pattern materials by removing material is known. Typically, such a process may compete with a conventional photolithographic method. Some observations may be made to compare laser patterning and photolithography.

Photolithography is much more widespread for many applications than laser ablation; yet, it entails many more processing steps. First the material to be patterned is covered with a layer of material, termed photoresist. The photoresist is exposed with a light pattern. Then, it is developed, leaving a patterned photoresist. The resist then serves as a mask for an etching step. The use of wet etch (acid or alkaline) or plasma etch (RIE, ion milling, or plasma) are some of the methods that will remove the exposed material at a much higher rate than the resist. Once the underlying material has been suitably etched, the cycle is completed by removing the resist and cleaning the patterned layer. It is only then that the permanently desired features can be quantitatively evaluated.

By contrast, etching by laser can be a single step process in which a high intensity pulsed light source that forms a pattern can directly etch the material away. There are other variations where, for example, the laser may be used to ablatively pattern an etch block and the subsequent material etch is performed conventionally. In both cases, the laser etch method can be used to reduce the number of process steps by a factor of about 3 to 10. This translates to enormous economic impact for the manufacturing of many types of electronic and other classes of elements. Typical electronic elements which can be ablated by laser include semiconductor chips, flat panel displays, interconnect structures, and multichip modules.

To date, one drawback of direct laser ablation has been the controllability of the ablating laser process. Forming the light pattern to give precisely the correct etching characteristics and pattern definition is one difficulty to overcome. The materials response as related to wall slope and feature dimension.

In co-pending applications for "Apparatus and Process for the Production of Fine Line Metal Traces" (Ser. No. 08/058, 906, filed May 6, 1993, now U.S. Pat. No. 5,364,493) "Use of Fresnel Zone Plates for Material Processing" (Ser. No. 07/940 008, filed Sep. 3, 1992, now U.S. Pat. No. 5,362, 940), "Apparatus and Process for Nozzle Production Utilizing Computer Generated Holograms" (Ser. No. 08/177,108, filed Jan. 3, 1994), "Apparatus and Process for optically Ablated Openings Having Designed Profile" (Ser. No 08/215,851 filed Mar. 21 1994) and "Direct Etch Process for the Manufacture of High Density Multichip Modules" (Ser. No 08/231,704, filed Apr. 29, 1994), the inventors disclose both the use of phase masks and ablative methods of forming suitable features for various applications. These applications are incorporated herein by reference.

SUMMARY OF THE INVENTION

The laser ablation control system and method described is active in starting laser ablation, continuing laser ablation and finally tuning laser ablation in view of product output. First, it provides a means of generating initial settings for laser ablation tool operation utilizing the high predictability of ablation on substrates of known composition. Second, it provides real time monitoring and control of the laser output in terms of the characteristics important to the system performance as it relates to the ablation process. Third, it entails statistical analysis of the photo ablated pattern with correspondent adjustment to ablation parameters. Most importantly, these elements are continuously combined to achieve optimized performance monitored during the ablation process.

A key aspect of this control architecture is that the ablated pattern may be directly observed and controlled. This contrasts with other techniques, such as lithography, that involve resist photo exposure, followed separately by resist development and material etch. As a consequence, the described process and apparatus result in a much more powerful and direct means for fine control of the overall etch process and the resulting permanent features.

The process control system described in this application is based on two main detections. The first detection characterizes an incident laser beam in detail, while the second detection samples the recently laser ablated features.

Regarding the characterization of the incident laser beam, the laser ablation process can be computed to a good degree of accuracy from the characteristics of the optical beam. The beam forming element characteristics can be combined with the ablation physics to predict the ablated pattern with high confidence. The characterized beam can then be maintained in real time with the initially utilized ablation characterization.

Thereafter, the observed ablated features produced may be directly compared to those predicted. Further control of the laser parameters can result.

The structure of the closed loops used to control the manufacturing process are delineated with respect to the laser beam control as well as other parameters. In the architecture shown, there is both a fast loop (for keeping the laser beam parameters near optimum) and a slow loop (overall optimization and tool setup).

The fast loop operates during a given processing exposure cycle, while the slower loop requires observations of the results of a given processing exposure to give a correction. Significant characteristics of the laser ablation process are that the result may be directly and rapidly observed and that the result is calculable from the physics of the ablation process. These properties combined with the sensor and software and computational architecture described, lead to a manufacturing process that can be very high rate, precise, and has many fewer steps than does its direct competition (such as lithography). Hence, the apparatus and process disclosed have very substantial economic impact for patterning of many types of materials by laser ablation.

The laser beam is produced by an external laser. The collimation and pointing of the laser beam is monitored in real time by system component sensors. Once the desired settings are given to a real-time servo controller, the collimation and pointing are closed loop controlled by actuators driving optical elements. In this fashion, even on a pulse-to-pulse basis in the case of pulsed laser, the beam is monitored and its parameters kept within a predetermined control band. The control settings may then be varied as the overall manufacturing and tool processing parameters are set. The laser beam properties are key to determining the pattern that may be ablated. The sensor also provides a characterization of the essential beam parameters and so serves as a beam diagnostic; in this way the sensor signals of the laser beam can be used to predict the ablation pattern as they provide input to the overall process model.

The data on the laser beam, as measured by the systems sensor, are utilized in a process control and optimization to determine the ablation tool settings. For the embodiment utilizing phase mask machining, the mask serves to transform the laser beam into a high intensity pattern that is ablated into the work piece. The process control and optimization utilizes the transformation property of the mask to determine the intensity profile on the work piece given an irradiance on the mask.

For embodiments utilizing imaging systems, where the mask pattern is similar to the irradiance on the work piece, the combined mask/lens optical train serves to transform the illumination field into work piece irradiance. Also, the focal properties of the mask and/or any other optics give the intensity as a function of the position and angle at the work piece for a given mask-work piece separation. This, combined with the materials properties, yields the expected ablated feature profiles. The profile is also a function of the total exposure, or number of pulses, and the spatial distribution of the irradiating beam. Working with this information, the process control optimize can generate the control settings that are sent to both the tool controller and to the real-time servo controller.

In an exemplary embodiment, the process control monitor includes a sampling sensor for observing the photo etched pattern immediately after it is etched. The sampling sensor and its associated data processing can determine the statistics of the pattern most recently formed. This information is fed back throughout the control subsystems. First, it is used to compare to the pattern predicted from the overall process model utilizing the observed laser characteristics and the mask and materials properties. Second, and using the comparison, the operating settings can be changed. For example, where the ablation parameters of a particular work piece vary, such variation can be accommodated by sampling the apertures obtained, and varying the operational settings, such as the scan rate to obtain openings of the desired dimension and configuration.

The tool controller takes the settings generated by the process model and optimization and converts them into actual commands and sequences for the tool operation. For a typical ablation tool, this may include scan settings for moving the laser beam over the mask, the total number of pulses, the repetition rate and processing time, the laser energy level, and other such parameters. The load/unload sequence and work piece position are set by the controller. The work piece is moved into the ablation region, positioned, and is stationary while the pattern is formed over a given region. Then, the work piece is moved. At the next position, or while it is being moved, the inspection unit can form an image of the pattern found. The tool controller commands the moves, and the inspection data is acquired during or after the move. The tool controller also has safety interlocks and ensures the tool is ready for operation.

The inspection unit is a CCD array. In the preferred embodiment, a 1-D array is used that acquires data as the work piece is scanned underneath it. Of course, a 2-D array may be used to image a stationary work piece. Both via, line patterns, and combinations thereof can be imaged giving the system the capability of imaging virtually all desired shapes of openings produced. A microprocessor is utilized to acquire the data and process it. A standard detection technique is utilized to locate edges. Both feature location, as well as position of top and bottom of the feature, are acquired. Alignment and overlay are measured by selected ablative fiducial feature location relative to underlying marks on the work piece. Due to the very large number of features and the need for high resolution, sampling is employed as opposed to full inspection.

Overall, the near real-time observation of the ablated features is coupled with a predictive calculation to assure stable and rapid ablative processing. The laser field is monitored and used for both control purposes and as an input to the predictive calculation.

The ablative feature data is directly compared to the predicted values. This allows the system to select and maintain the optimal control values.

It is an advantage of the present invention to provide near real time in situ monitoring and a means to initially set and then optimize the various control elements of the laser ablation system.

It is a further advantage to have a system with a high degree of predictability from the input optical field to the ablated patterning.

It is a further advantage to use the invention with many methods of producing a patterned light beam, including both phase mask machining and projection imaging, and for many types of patterns. The invention will be useful over a very large range of feature sizes.

It is a further advantage of the present invention to provide monitoring and control for all types of photo ablative systems.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer its like parts and in which:

FIG. 7 is a table of the subsystems and their descriptions and location of the associated computations;

DESCRIPTION OF THE PREFERRED EMBODIMENT

Figure 1:
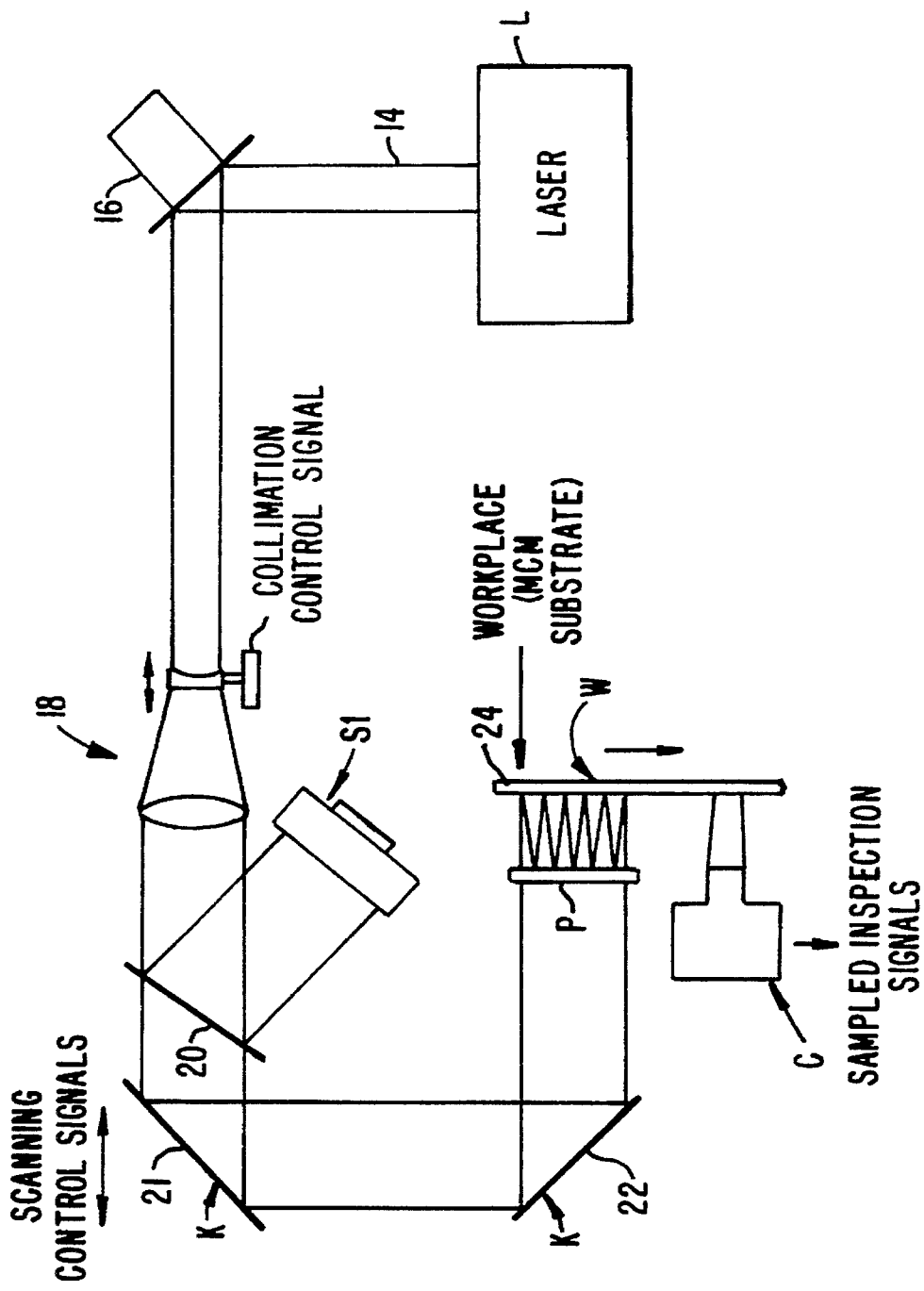
FIG. 1 is a block diagram of the control and sensing elements for phase mask machining.

The basic layout for using the controlled ablation manufacturing is shown in FIG. 1. Laser L is typically an excimer laser independent of the ablation tool. The laser output 14 is passed through pointing correction 16 and collimation control 18 and is diverted at beam splitter 20 for analysis. Such analysis occurs at sensing signal generator S1 otherwise referred to as the system components sensor. The detected signals are then processed in real time to provide drive commands for the collimation control 18 and pointing correction 16.

Construction of pointing correction 16 is conventional. Specifically, this mirror has piezo electric control and pointing elements in two degrees of freedom relative to the beam axis to enable corrective pointing of laser output 14.

The beam then passes through scanning control K including first mirror 21 and second mirror 22. The scanning control signals are associated with scanning the laser beam across phase mask P. Work piece W, shown here as an MCM substrate 24, is positioned under the phase mask so as to be patterned.

Phase mask P has been previously described in copending U.S. patent application Ser. No. 07/940,008 filed Sep. 3, 1992, now U.S. Pat. No. 5,362,940, a Continuation of U.S. patent application Ser. No. 07/612,212 filed Nov. 11, 1990, now abandoned, entitled Use of Fresnel Zone Plates for Material Processing. This patent application is incorporated herein by reference.

Sensing signal generator S1 and its resultant signals are also used to characterize the laser beam for input to software and hardware that can predict the features and their statistics as a function of the length of exposure, tool operational parameters, the laser beam parameters, and the mask parameters. Thus, the predicted feature parameters and statistics may be directly compared to those observed with the camera viewing system.

The overall system performance may then be corrected in terms of the tool settings, if desired. A particular method is to derive influence or correlation coefficients for tool and laser settings on ablated feature dimensions and statistics through the process model. Then, the influence coefficients can be used to derive the corrected tool settings.

Figure 2:
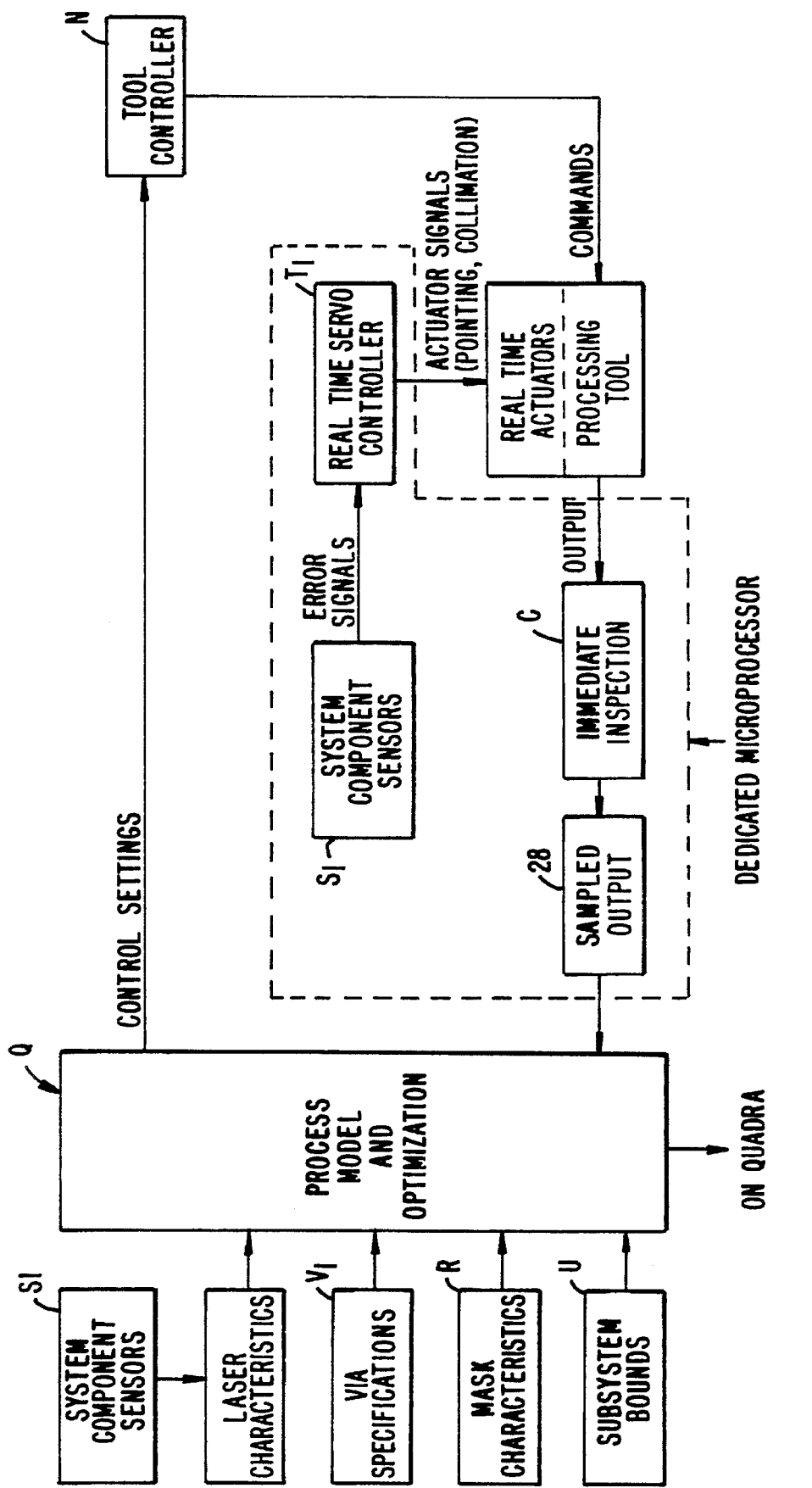
FIG. 2 is a block diagram of the overall system software and control architecture.

FIG. 2 shows the basic architecture for the software, sensors, and control signals.

Process model and optimization Q performs several functions. First, and once the ablating beam has been characterized, for a new pattern with new exposure features and/or materials, it is used to generate the initial settings for the processing tool. Here, it has a laser field that has been measured at sensing signal generator S1. It then takes via specifications V1, mask characteristics R, and system bounds U. It takes this information as inputs in order to derive control settings. For example, as taught in "Apparatus and Process for Optically Ablated Openings Having Designed Profile" (Ser. No. 08/215,851, filed Mar. 21, 1994), the effect of sequential pulses may be calculated to generate wall profiles for an incident optical pulse energy distribution. For example, typical applications for an MCM entail a polyimide dielectric thickness of 10 microns, with a removal rate of about 0.2 microns per pulse.

Further, by way of example, the input shown as via specifications V1 could include top and bottom dimensions and their allowable variance, wall angle and acceptable deviations, constraints on material at the bottom of a blind via, etc. Mask characteristics R may include working distance, gain from incident fluence to fluence on the work piece W at ablating image J, fluence profile and working distance value dependence. Transmitted with the mask characteristics R are the etch properties of the material, as a mask is nominally designed at a certain operating point. In addition, there are operational parameters of the subsystems. These include scanner speeds, field sizes, laser power, and the like.

With the above inputs, process model and optimization Q computes feature sizes and statistics by varying scan rate, repetition rate, power level, and the like for reference scan patterns and for the initial stored laser parameters. Process model and optimization Q portion searches out and selects the highest throughput with acceptable feature dimensions and statistics.

The tool settings generated are then fed to the tool controller N, where the software adjusts all of the external command signals accordingly. In addition, control signals from sensing signal generator S1 are generated for allowable excursions in pointing and collimation and these are sent to the fast control loop at real time servo controller T1. So, the initial tool setup is performed by process model and optimization Q.

As the tool operates and acquires data from the sensing signal generator S1, this data may be stored. Then, process model and optimization Q can be utilized to determine the feature dimensions and statistics based on actual laser data.

Using either the originally predicted feature data or that generated as a result of tool operation, the comparison to the observed data from the sampled output can be made. The difference in features observed at camera C versus calculated become the basis for further tool control signal correction, at sampled output 28. The simplest method is to generate influence coefficients between the feature dimensions and statistics for the tool parameters in a neighborhood around the optimal operating point. Then, the corrections to the command settings can be obtained simply from the observed feature dimensions and statistics.

Figure 3:
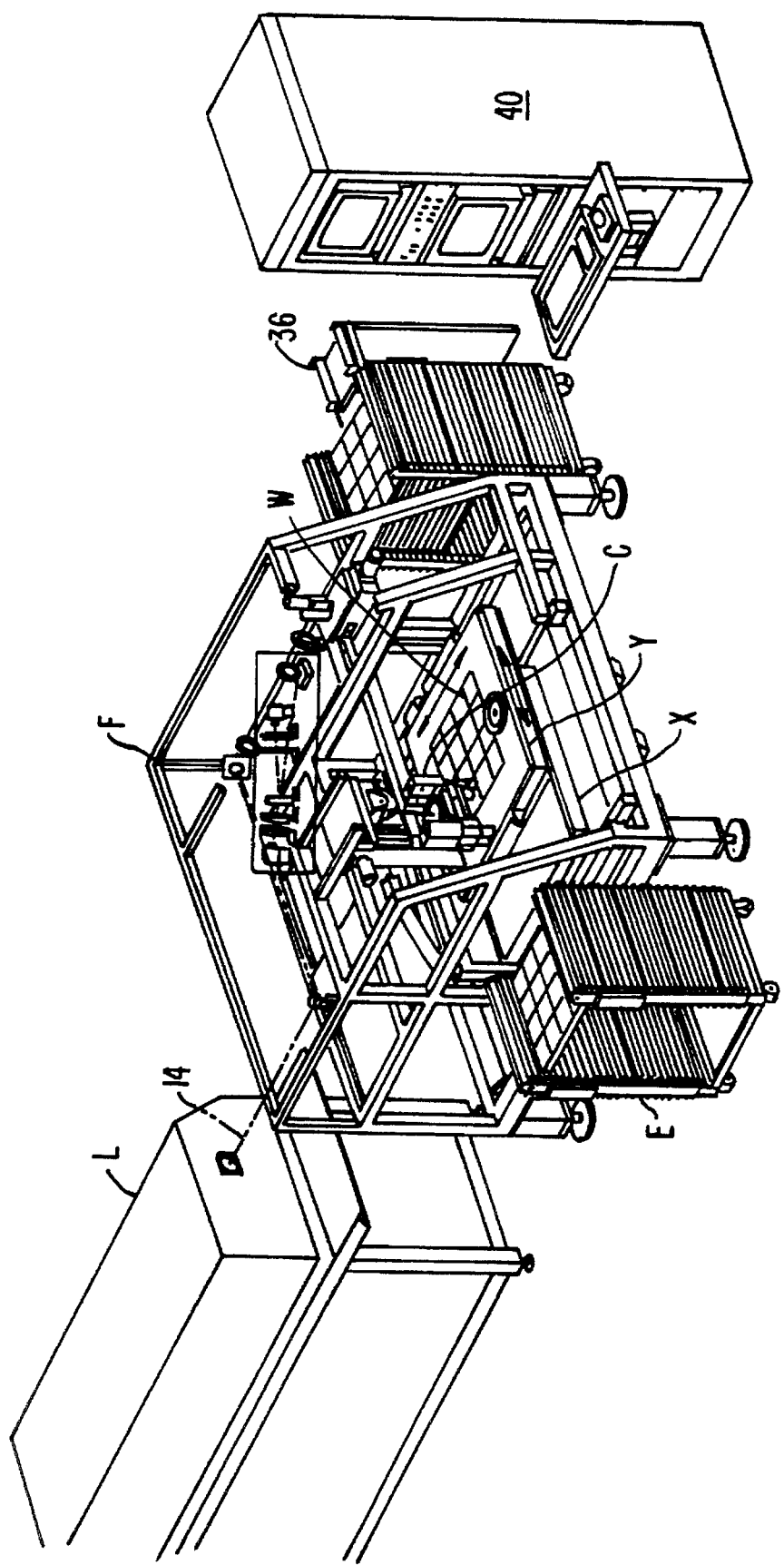
FIG. 3 is an isometric of a phase mask tool with the sensors of this disclosure.
Figure 4A:
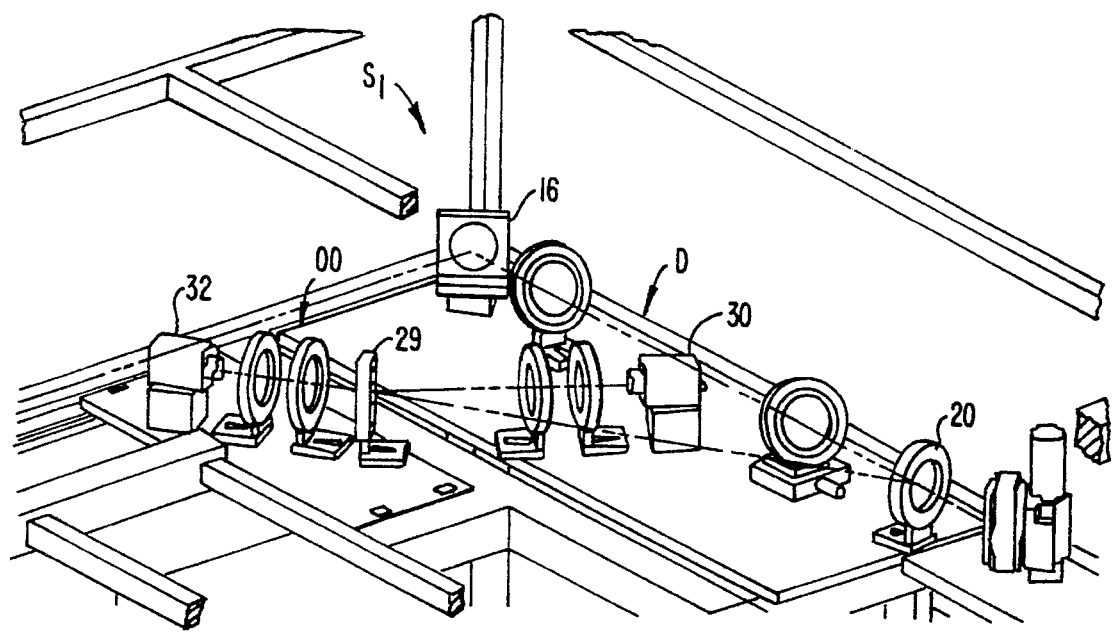
FIGS. 4A and 4B are two diagrams showing the system component sensors as incorporated to the phase mask tool of FIG. 3.
Figure 4B:
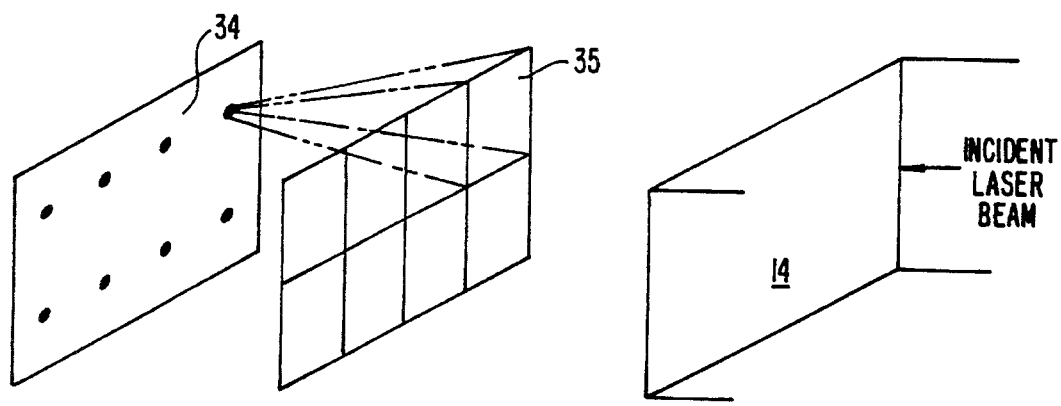

The physical mounting of the controlled manufacturing hardware is shown in FIGS. 3 and 4A and 4B for a particular large panel phase mask tool. Laser L generates output light 14. Referring to FIG. 4A, laser output 14 is beam split and directed into sensing signal generator S1. As shown in FIG. 4A, sensing signal generator S1 contain two separate elements. These elements are pointing sensor M and intensity profile sensor OO. Initial detour of a light sample to the sensing section occurs at beam splitter 20.

Typically, a pulsed excimer laser would produce about 0.3 joules/pulse over a footprint of some 1×2 cm before a nominal 1:3 telescope expansion. An internal beam splitter 29 is used to divide out light for each sensing section. The first sensing element is quad cell 30, and the data is read out for each pulse and standard centroid calculation performed to determine the displacement from the center of the cell for a focused beam. The adjustments of the centroid detector optics and the beam splitter determines the angular reference for aligning the laser with the tool. Typical resolution desired is $2\times10^{-5}$ radians, with a capture range of about $3\times10^{-4}$ radians. The readout electronics are capable of single pulse and pulse multiple averaging. A repetition rate of 100–200 Hz is typical of the excimer lasers used for photo ablation. An overall closed loop bandwidth of 10 Hz is adequate to correct pointing drifts.

Second sensor element 32 is used to determine the phase, intensity, and coherence profile of the optical beam. It comprises a two dimensional CCD array with a focusing lens plate and associated optics and electronic readout. FIG. 4B shows the essential optical arrangement. At 8 positions in the nominal 3×6 cm beam, laser output 14 is separately sampled by focusing a segment onto a CCD array 34 through Hartmann lens matrix 35. The focusing section forms spots on the array. The centroid of each spot gives the local tilt across the segment in both X and Y. The shape of each spot gives the coherence, averaged over sampling aperture of the beam. The integrated intensity of each region gives the intensity averaged over the sampling aperture size. Typical values of the tilt are $10^{-4}$ radians. The sensor should have centroid resolution of $10^{-5}$ radians. The readout electronics may be used to subtract background photon and pixel readout noise. The coherence function is derived by analyzing the focused spot for its intensity distribution. The readout will average several pulses. This element is generically referred to as collimation sensor D.

The laser subsystem sensor plays a central role in this invention. It supplies data for the two separate loops, both the fast closed loop and the slower overall process model and optimization Q. Of all the elements in the system contributing to nonuniform features or feature spacing with a phase mask P, the pulsed lasers are usually the largest source. The optical beam shaping elements, such as imaging masks with lenses or phase masks, are very stable and predictable. The optical performance of the ablating laser dominates the overall performance.

The inspection camera C are shown mounted around the phase mask holder in FIG. 3. Of the four cameras shown, two are inspection cameras C. The remaining cameras are used for positioning work piece W and will not be further discussed herein. As the work piece is moved after processing, the cameras image the surface onto 1-D CCD arrays. In this fashion, data is taken in strips. Standard edge detection techniques are applied to find features. A resolution of 1μ is desired, so for a CCD with 30μ element spacing, a strip about 0.03" wide may be resolved with a $10^3$ element array.

The remainder of the system is easy to understand. It includes x-stage X, y-stage Y for moving work piece W. Similarly, and as symbolically shown in FIG. 1, phase mask P can be moved with x-direction movement 37 and y-direction movement 38 relative to work piece W. This combination of movements enables a full range of features to be applied to work piece W.

Provision may be made for either automated or semi-automated handling of work piece W. Transportable elevators E combined with loading plungers 36 can be utilized. Conventional computer controls can be located in cabinet 40.

Figure 5:
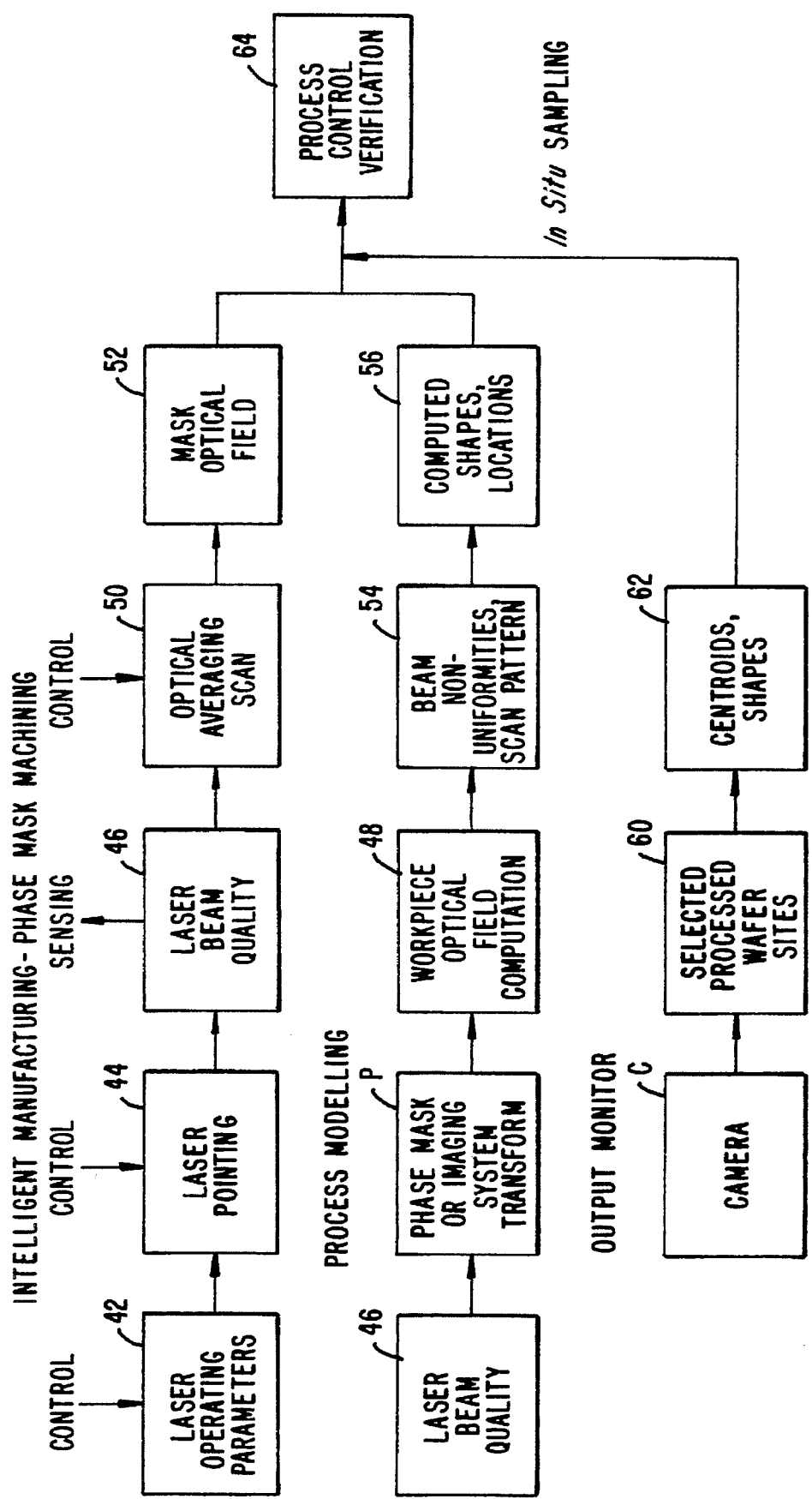
FIG. 5 is a diagram summarizing the calculation and comparison sequence.

The flow chart shown in FIG. 5 illustrates elements that go into the computation herein. The laser optical field as is monitored and controlled is the key variable on the mask. The top line shows the method of producing this field. The process modeling takes laser operating parameters 42, laser pointing 44, and laser beam quality 46 including pulse length, power, and the like. The laser beam pointing and quality (including intensity variations, local tilt, and coherence effects) is also measured at this time. These measurements are converted into the modeled optical field 48 at the work piece. Optical averaging scan 50 and mask optical field 52 are also inputs to these measurements.

The effect of phase mask P (or imaging mask) with lens is treated as a transform of the incident light. In the flow shown, it is implicitly assumed that the support of the light produced on work piece W is a relatively small portion of the mask such as subapertures Z on phase mask P (See FIG. 1B). This permits a straightforward computation of the work piece optical field that is then convoluted with beam tilt and intensity fluctuations 54 in the next calculational step.

This assumption is reasonable in practice with typical excimer laser beams. Shapes and locations 56 are then computed for a given optical field input scan pattern, and tool operating parameters.

The output monitor utilizes camera C to observe features at selected sites 60. Shapes and centroid positions 62 are then produced. Since this data comes from a specimen very recently processed, it is considered to have been sampled in situ. The overall process control is then verified by comparing the sampled data with that computed at process verification 64. This permits rapid comparison and adjustment of the predicted and observed data.

Figure 6:
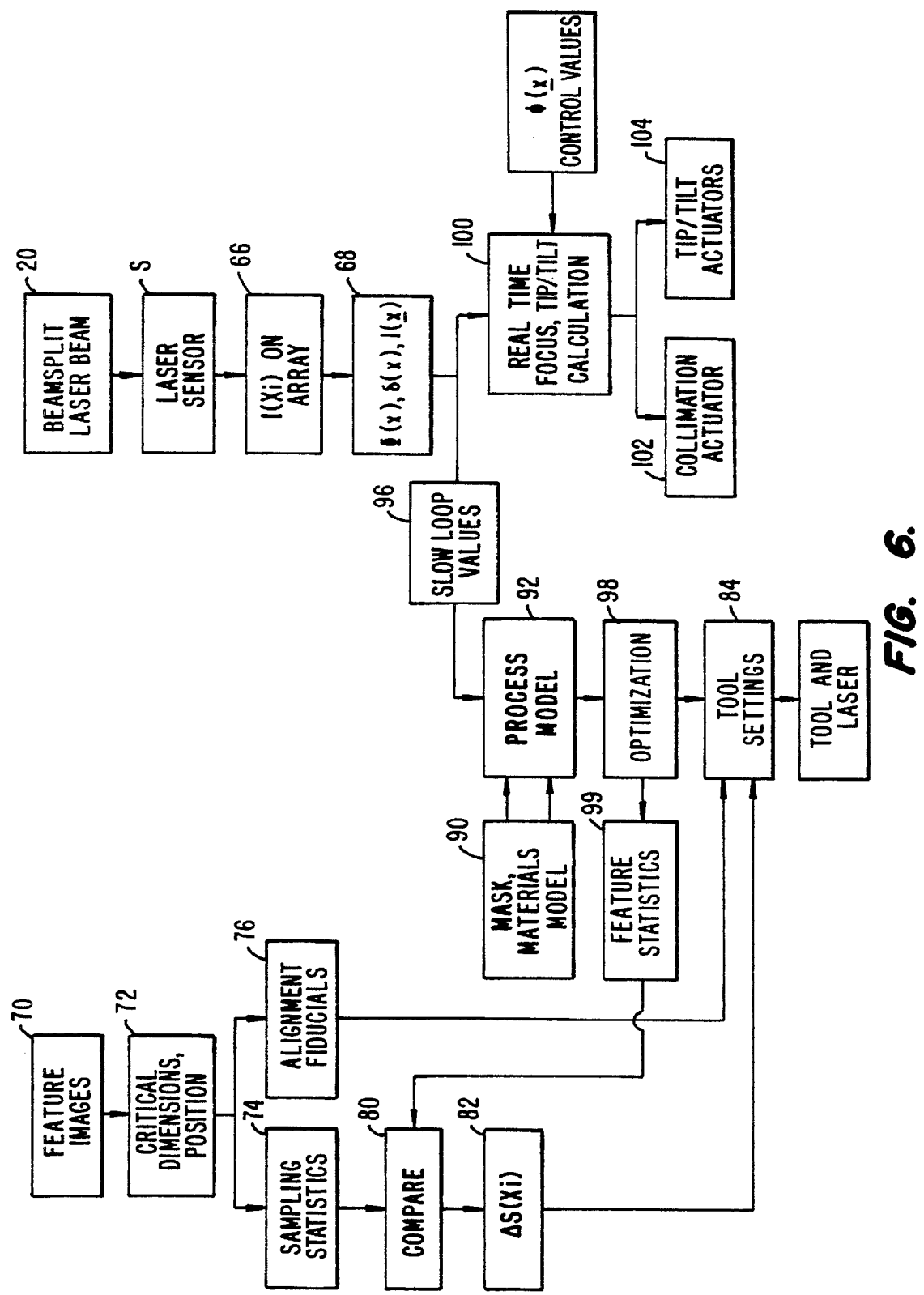
FIG. 6 is a figure showing overall data flow.

FIG. 6 shows the overall data flow for the preferred embodiment. This diagram can be best understood in terms of specific examples related to measurements performed for the process of this invention.

Referring to FIG. 6, and generating laser sensing particularly the initial prediction of via and line characteristics, the real time characteristics of the beam from laser L must be measured.

In order to understand the real time condition of light emitted from laser L, the following measurements are made:

I(x,y)—2-dimensional beam intensity profile—See FIG. 4B and beam intensity calculation 66 on FIG. 6.

Thereafter, Φ(x,y)—common phase across beam or wave front across the beam—See FIG. 4B; and, σ(x,y)—spatial coherence of beam—See FIG. 4B are made at measurement step 68. This is the net direction of the light in each segment of the beam.

Meaning or interpretation of measurements

I(x,y)—intensity over a plane taken normal to the beam;

Φ(x,y)—common phase over a plane taken normal to the beam;

σ(x,y)—really 3 quantities, fraction of energy within central core, full width half maximum of the X+Y beam divergence.

The measurements taken relate to the so-called "core" of the light emitted by the laser. There is always a core to the light emitted from laser L. This is the useful light which can subsequently be focused. This core is within a much broader halo of light as seen when focused onto a camera.

It is necessary to measure the fraction of energy in the central core, and the divergence in X and Y direction relative to the Z-axis of the beam. It will be noted that it is possible to further characterize the measurements; however, for the needs of this disclosure, the measurement of the parameters listed here is sufficient.

I(x,y) beam is directly imaged onto a camera or a sampling of the transverse beam profile at a number of discrete points is made. This is the Hartmann Plate CCD Combination Sensor set forth schematically in FIG. 4B. Specifically, by observing where the image points fall on CCD detector, it is possible to reconstruct the wave front as it appears at Hartmann plate or lens array 35. This is a well understood process.

Φ(x,y) A small portion (←1%) of the (preferably expanded) beam is picked off at beam splitter 20 and passed through a Hartmann-type wavefront sensor. The phase Φ is approximately reconstructed from the centroid generated from the discrete measurements of the images from the Hartmann plate on the CCD array.

σ(x,y)—The photosensitive part of the abovementioned wavefront sensor is a CCD camera and the multiple spots are separated enough that the individual peak amplitudes and spot widths can be measured. The peak amplitude is correlated with the fraction of energy within the central core.

Use of measurements in predicting via characteristics such as the feature position and the deviation of the feature from its nominal position is calculated beginning with feature image 70. With the initial dimensions and position of the feature 72 is compared to sampling statistics 74 from camera C and correlated with alignment fudicials 76. Comparison 80 is made from the above as:

$$Xn-Xo=z/k*\int dx*I(x)*\nabla\Phi(x)/\int dx*I(x)$$

where:

Xn=nominal or expected (x,y) position of feature

Xo=observed position of feature z=mask working distance k=2*π/λ

I(x)=beam intensity profile convolved with scanning profile;

∇Φ(x)=the gradient of the phase.

The above equation measure deviation 82 (See FIG. 6) of the intended position of the feature from the actual position of the feature due to the phase which the laser is putting out in real time. Where there is a gross phase distribution across the beam, the deviation in position and average variation of the gradient of the phase over the entirety of the beam is measured and utilized in feature position and dimension prediction. Initial and positional tool settings 84 are then generated.

It will be required that the particular process being utilized to effect ablation be taken into account. In FIG. 1B, we have shown phase mask P having holograms H in subapertures Z. In put from the particular holograms H being used and subapertures Z will occur at input 90. Give the real time characteristics of laser output 14, input to slow loop 96 for initial settings can now occur.

Each opening which is ablated in work piece W will be characterized by an entrance size/shape. The entrance size and shape is determined by the intensity profile hitting the workpiece. The intensity on the workpiece Iwp(x) is calculated from the formula $$Iwp(x)=Ipm*\int dy/z*Idl(x-y)*G(y/z)$$

where;

Iwp(x)=intensity profile on the workpiece;

Ipm=intensity of light hitting the phase mask;

Idl(x)—relative intensity of light hitting the workpiece when an un-aberrated laser beam hits the phase mask (it being known that this is known from the original design.)

G(Θ)=normalized angular distribution of light from the scanning laser beam.

This equation is a convolution of the intensity profile for a "perfect" laser beam—a beam with no net phase and no beam divergence—with a factor that includes the coherence and beam quality of the beam. This is the sum of several Gaussian distributions.

One way the above computation may be optimally handled is with use of a look-up table. Specifically, by calculating the results for a wide range of values, and thereafter utilizing a "look-up" protocol, rapid results may be obtained. Interpolation can be used. Alternately, a dedicated microprocessor may be used.

Since from shot to shot Ipm will vary, the maximum value of Ipm ($Ipm^{max}$) determines the entrance size and shape according to:

$$Ithresh-Iwp(x)$$

where Ithresh is the threshold intensity for ablation and Iwp is evaluated using $Ipm^{max}$. This determines which points constitute the boundary of entrance hole.

With respect to materials and their ablation in general, most materials have a well defined threshold at which ablation begins. Further, and for values exceeding the ablation threshold, the rates of ablation are likewise well understood and quantified. This being the case, high predictability can be established.

Exit size/shape—The exit size and shape is generally more difficult to compute than the entrance size. Its computation is described in some detail in co-pending U.S. patent application Ser. No. 08/215,851 filed Mar. 21, 1994 entitled "Apparatus and Process for Optically Ablated Openings Having Design Profile." For simplicity, these computations are usually done in advance under a variety of circumstances likely to be encountered in practice, and these results are used to infer the features exit size and shape under the actual conditions. The above entitled application is hereby incorporated into this application by reference.

Combining this information, optimization value 98 can be generated from which feature statistics 99 can result. These respective feature statistics 99 can thereafter be compare to comparison 80 from sampling statistics 74.

Laser Sensing→Real Time Control

It will be understood that the "real time control" of the beam mainly effects the phase and the overall power of the laser beam. The system is designed to keep these parameters within acceptable limits. Specifically, and utilizing beam intensity calculation 66 and measurement step 68, real time calculation 100 is made with collimation actuation 102 and tip/tilt actuator 104 (See pointing correction 16 in FIG. 1).

Pointing of the beam is calculated as before. Here, the problem is to maintain the pointing direction within certain tolerances. This can easily be done utilizing a so-called Quad Cell array 30—and measuring the position of the beam with respect to the cell. It will be noted that the Hartmann array CCD cell 32 can operate also for this purpose. (See FIG. 4A and 4B).

It will be understood that pointing correction mirror 16 is piezo actuated in at least two degrees of freedom. This closes the loop with the detected pointing enabling real time closure of this variable of laser output.

Measurements made are the same as in laser sensing for the prediction of via and line characteristics. The manner in which the measurements are made is likewise the same.

Likewise, the meaning or interpretation of measurements is the same as in laser sensing for prediction of via and line characteristics.

Use of measurements in real time control

Pointing—Once the tool has been set up the direction the laser beam propagates it remains fixed. The indication of laser beam pointing is any deviation of quantity $$T = 1/k * \int dx * I(x) * \nabla \Phi(x) / \int dx * I(x)$$

Once set at an initial value $T_0$, this value is maintained by dynamically redirecting the beam.

Collimation/ Astigmatism—The second order phase moments of focus and astigmatism are computed by evaluation of the quantities.

$$T_{xx} = \int dx\, I(x) * \partial^2 \Phi / \partial x^2 / \int dx * I(x)$$
$$T_{yy} = \int dx\, I(x) * \partial^2 \Phi / \partial x^2 / \int dx * I(x)$$
$$T_{xy} = \int dx\, I(x) * \partial^2 \Phi / \partial x \partial y / \int dx * I(x)$$

They are zeroed out by adjusting the spacing of pairs of cylindrical lenses arranged as anamorphic Galilean beam expanders. By the well known expedient of either varying the spatial relation between the cylindrical lenses or altering their relative angular orientation (perpendicular to the optical axis) control of astigmatism can be maintained.

Power level can be expressed as:

$$P = \int dx\, I(x)$$

Simply stated and by way of appropriate simplification for this disclosure, its value is maintained by adjusting the operating voltage of the laser.

Feature measurement→Tool settings

Measurements made include feature shape/size—which is taken by camera C. Entrance and exit opening sizes are measured for a sampled number of feature—it not being necessary or desirable to measure all such features. In some cases, the 3-D wall profile can be measured where wall shape of the ablated profile is important. For example, top diameter, bottom diameter, eccentricity, wall slope can all be measured. Wall profile can be measured by a confocal microscope.

Further, feature position—location of the feature is determined using a viewing system. This would usually be the center of mass of the feature as determined through the camera.

Regarding the tool settings—the scan pattern is adjusted so as to impart acceptable quality for all the features in the minimum amount of time. Intensity level is varied by voltage control of the laser. Magnification is controlled by beam expansion—although this is useful mainly in the initial setting of the tool.

The predictions previously attained are correlated with actual measured values. Since we have an internal model for predicting feature properties from tool settings, a correlation of predicted values to measured values allows us to make accurate predictions of feature shapes. This combination of model and data provide powerful means for determining tool settings.

By way of example, if a measured via is say two microns to small, change of the scan pattern to either increase dwell time or move more of the hotter portion of the beam over the via would be utilized. This would entail running through the predictions previously set forth with the new tool setting—and again obtain prediction as to aperture or via size. This would correlate that actual and predicted feature.

FIG. 7 shows a summary of the subsystems for the preferred embodiment and gives the location of the computer architecture. There are two computers in the system, a dedicated microprocessor α(preferably a Zworld Link Giant) and Macintosh Quadra or equivalent.

Figure 8:
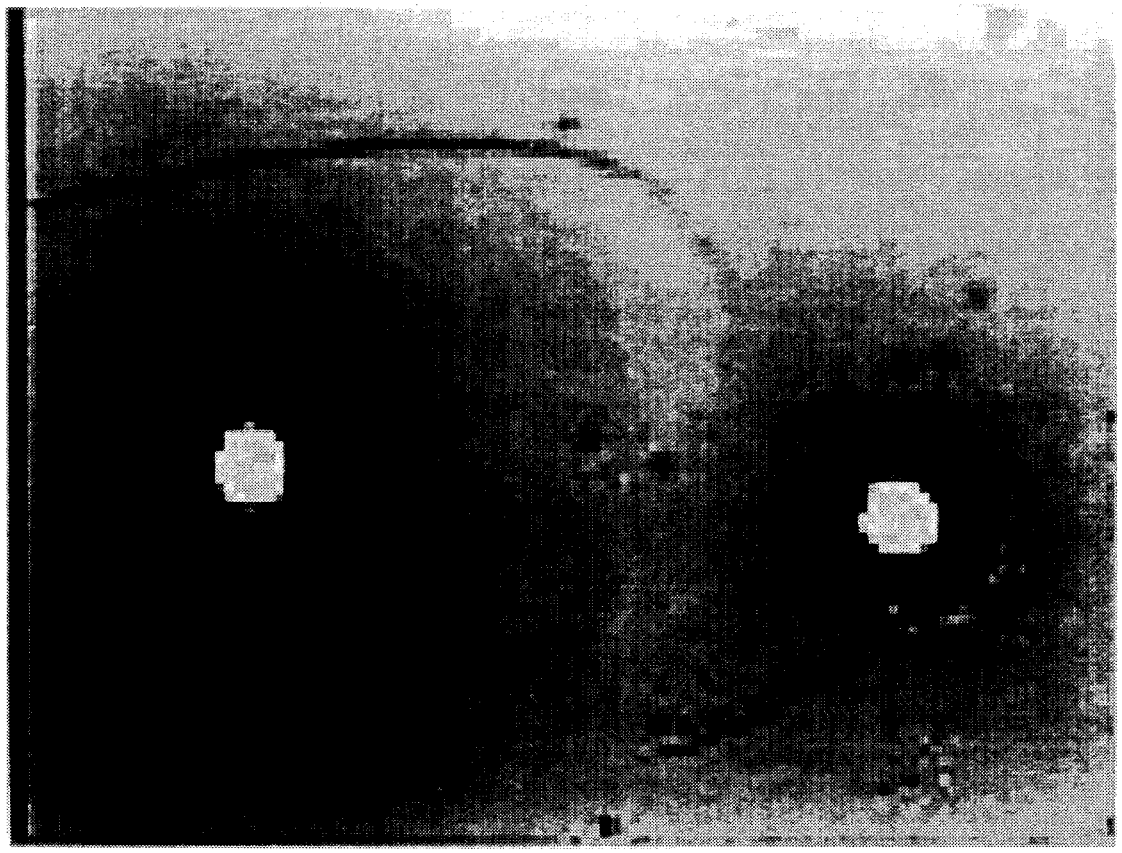
FIG. 8 is a picture of via features produced in an MCM-D.
Figure 10:
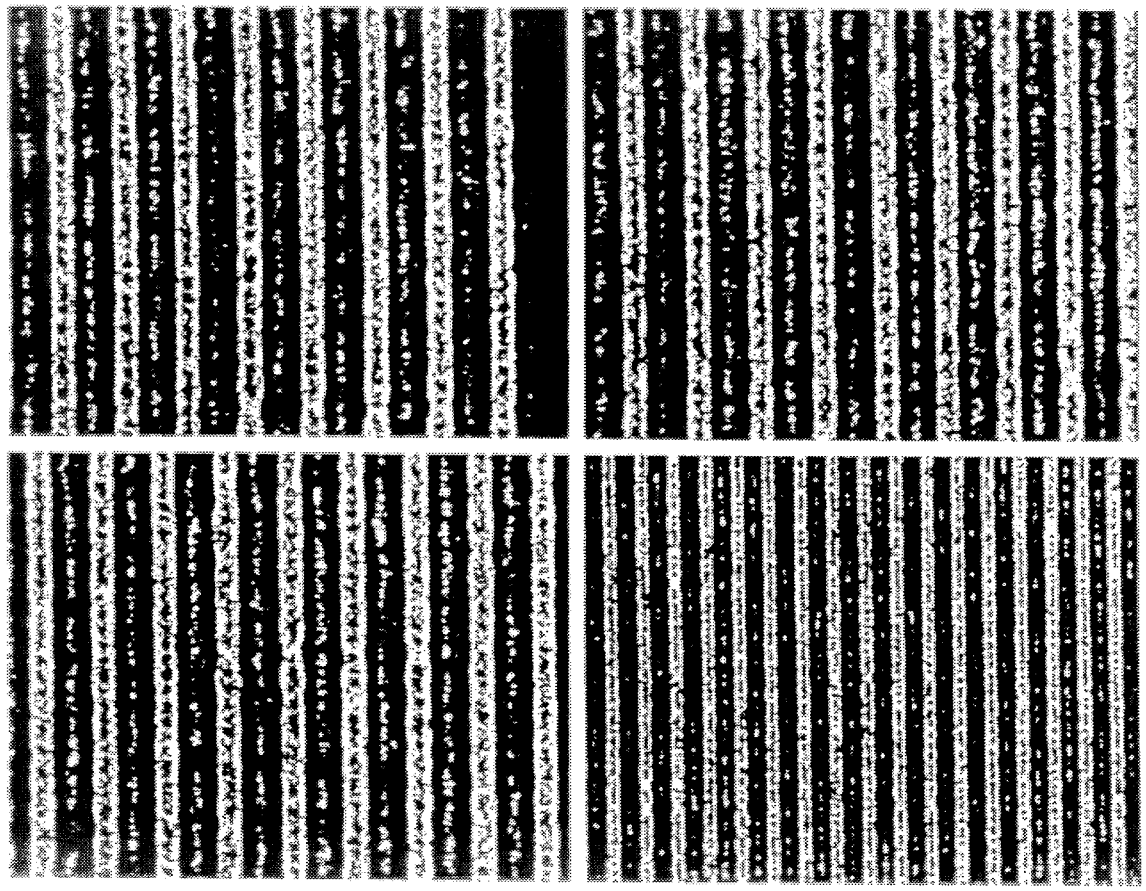

FIG. 8 and 10 show Via and Line patterns etched in polyimide over a metal substrate. The dark annular ring in FIG. 8 is the region where the smooth tapered wall traps the illuminating light. These illustrate typical features. Critical dimensions are the feature width at the top and bottom and feature placement over the field of exposure. The sampled output contains such dimensions over selected portions of the photo ablated field.

Figure 9:
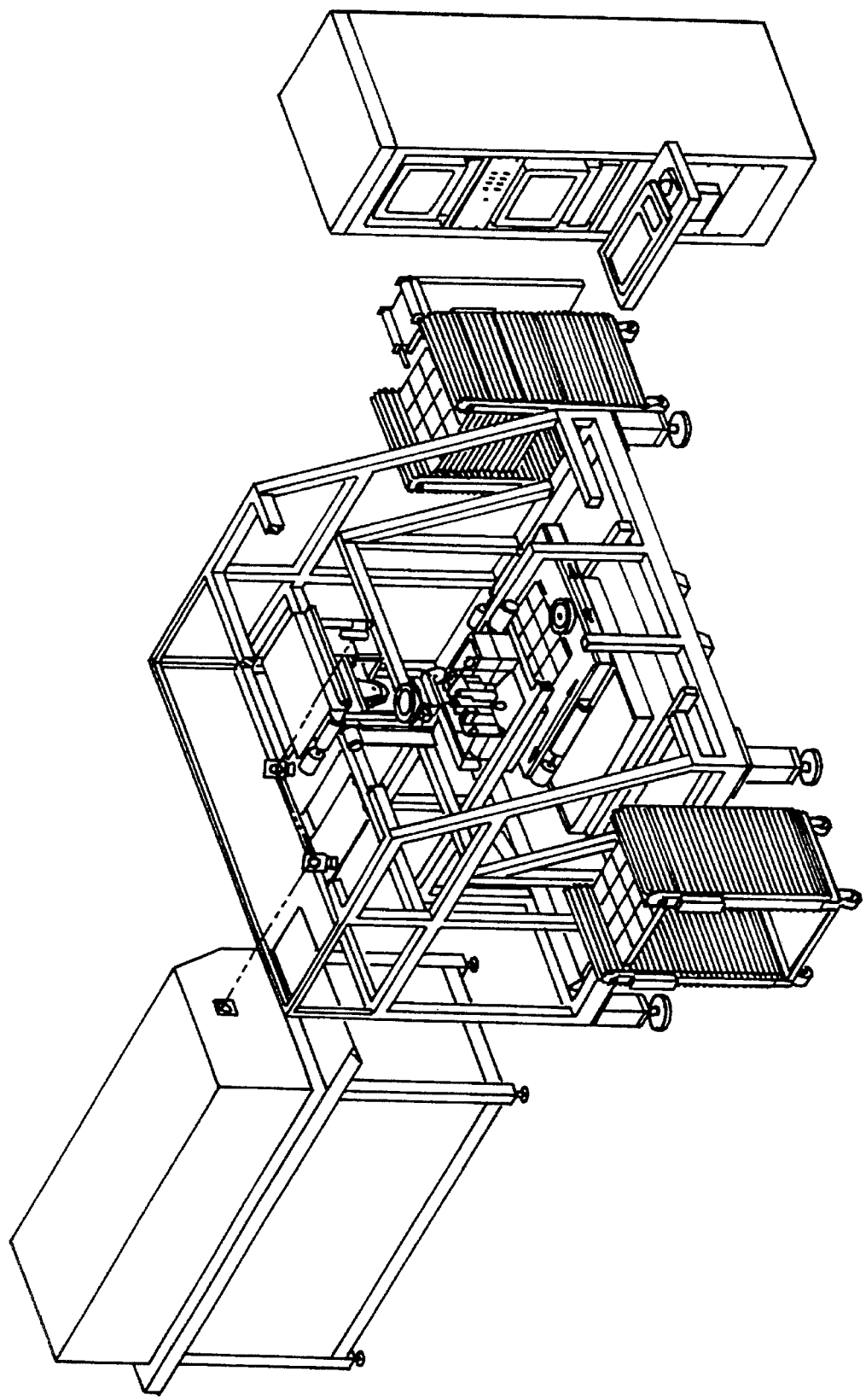
FIG. 9 is an isometric of an imaging phase mask machining tool with manufacturing; and, FIG. 10 is a picture of an etch block pattern.

In FIG. 9, we see the invention herein applied to a phase mask imaging system. Here, since a homogenizer plate is used to make the beam $\Phi(x)$ and $\sigma(x)$ much larger than typical beam variations and the $I(x)$ essentially uniform, the emphasis is not on a detailed real-time characterization of the laser beam. The manufacturing concentrates on the control elements. These include the scan and feature registration produced by the telescope motion for other particular tool designs shown. The overall laser power is monitored with a unit integral to the laser.

Note that there is no laser sensing package at the same level of sensitivity as compared to the phase mask machine of FIG. 3. Now the optical field characterization is given by that measured for the homogenizer plates, which is time independent. The rest of the procedure and control method is the same.

Prediction of Fluence Required to Shape Apertures

It is known ("Ultraviolet Laser Ablation of Organic Polymers" by Srinivasan et. al., *Chem. Rev.* (1989), 1303–1316) that a number of commercially important polymers (polyimide being one) can be ablated with ultraviolet light. Ablation of polymers with ultraviolet light typically requires short (<1 μsec) pulses at moderate fluences (~10–1000 millijoule/cm$^2$). One characteristic of polymer ablation is the existence of a fluence threshold, $J_{th}$, below which there is no significant ablation.

Experimental and theoretical work by us has determined that, in general, irradiation of polyimide with an appropriate fluence profile produces stable structures. That is, after a certain number of laser shots, a through hole will have formed in the polyimide and after another interval of shots, the resulting structure in polyimide will have stabilized in the sense that subsequent laser shots do not alter the via size or shape. The existence of these stable profiles for vias has not been noted hitherto.

One of the purposes of this invention is to exploit our observation of stable opening wall structures of the convex variety. In the case the desired opening wall structure has a convex profile application of the appropriate fluence profile results in the desired opening and, exposure to ablating radiation can occur within relatively wide tolerances.

Another purpose of this invention is to identify those unstable opening wall structures which include portions of the wall having concave configuration. In case the desired opening wall structure has an unstable profile, both applied fluence profile, the total quantity of ablating radiation, as well as the intensity of the ablating radiation can be adjusted so that the desired (unstable) opening wall structure is achieved.

In the following discussion, the reader will understand that a mask having traditional image information thereon—such as transparent, partially transparent, and opaque portions—or so-called holographic masks can be used. Also, high power phase masks such as those set forth in the co-pending application HIGH POWER MASKS FOR IMAGING SYSTEMS (Ser. No. 07/833,939, filed Feb. 10, 1992, U.S. Pat. No. 5,328,785) and APPARATUS AND PROCESS FOR THE PRODUCTION OF FINE LINE METAL TRACES (Ser. No. 08/058,906, filed May 6, 1993, now U.S. Pat. No. 5,364,493) can be used. In addition, direct phase mask machining as set forth in USE OF FRESNEL ZONE PLATES FOR MATERIAL PROCESSING, a Continuation-in-Part of Ser. No. 07/940,008 filed Sep. 3, 1992, now U.S. Pat. No. 5,362,940 which was a File Wrapper Continuation of Ser. No. 07/612,212 filed Nov. 9, 1990, now abandoned, and GENERALIZED GEOMETRIC TRANSFORMS FOR COMPUTER GENERATED HOLOGRAMS U.S. patent application Ser. No. 08/175,052, filed Dec. 29, 1993 can be used. Phase mask machining is the preferred mode of operation for this invention.

Determination of Design Fluence Profile for Convex Openings

In the following discussion, until notation is made to the contrary, wall profiles with convex construction will be discussed.

Figure 12:
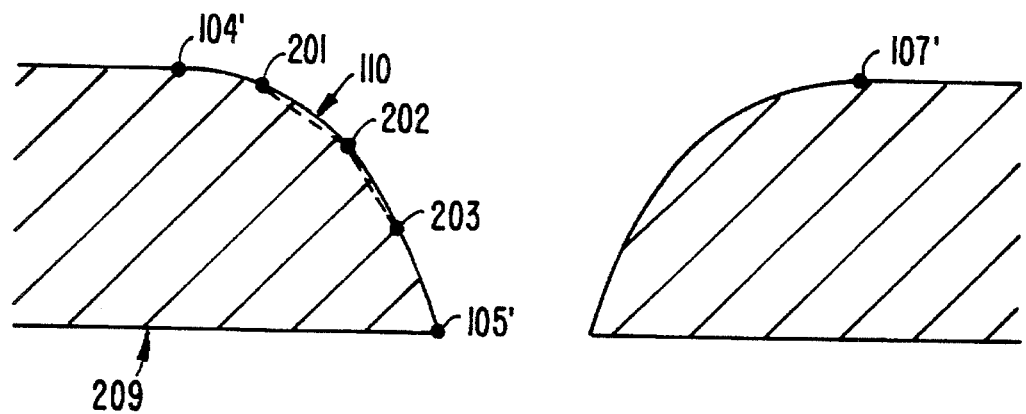
FIG. 12 is an expanded cross section of an opening.
Figure 13:
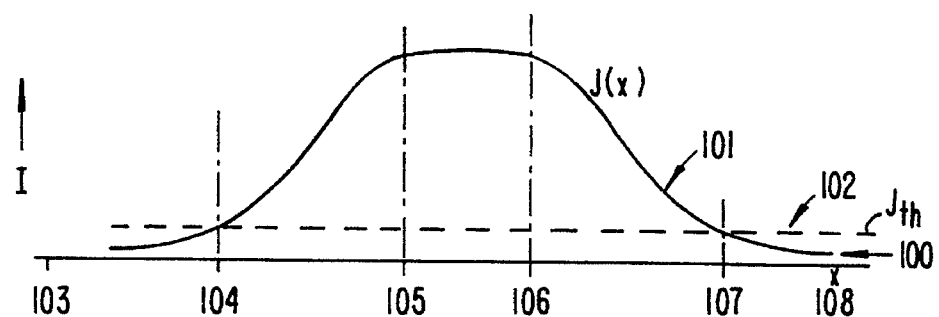
FIG. 13 is an expanded intensity profile.
Figure 14:
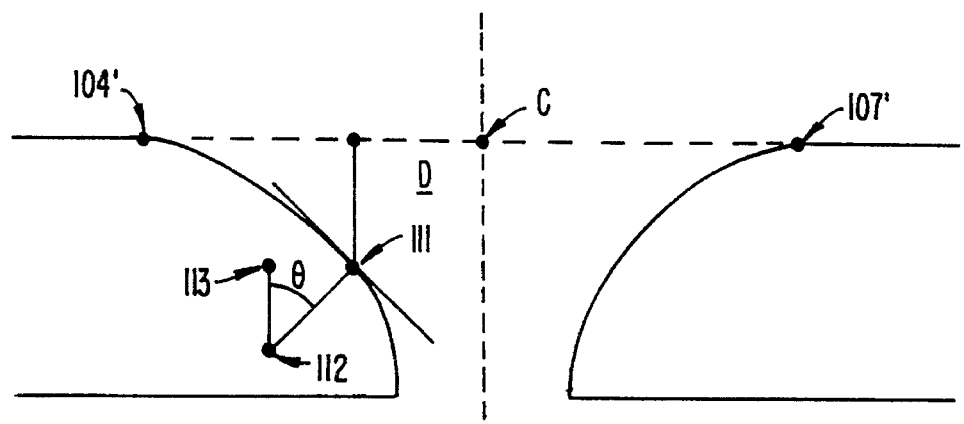
FIG. 14 is a diagrammatic representation of the rate of change of depth with respect to translational position so that coordinates for the designed intensity profiles can be further understood.
Figure 15:
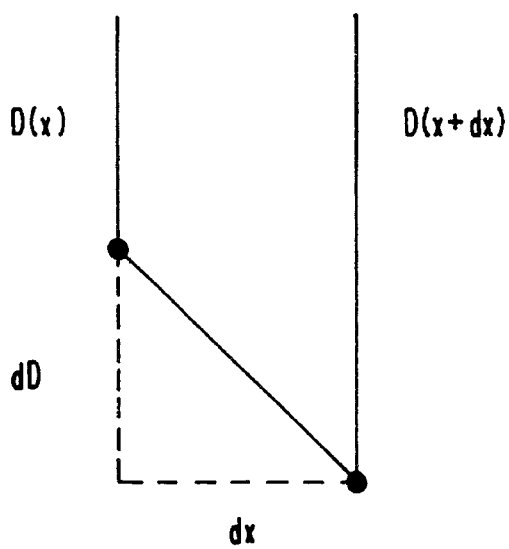
FIG. 15 is an illustration of a mathematical derivative dD/dx.

The following simple rule distinguishes convex hole openings from other openings. Referring to FIG. 12, a chord between any two points of the profile opening has all of its points interior to the ablated material. Thus chord 201–202 lies wholly inside of substrate 209, which is to be patterned. Chord 202–203 lies similarly inside.

Figure 19:
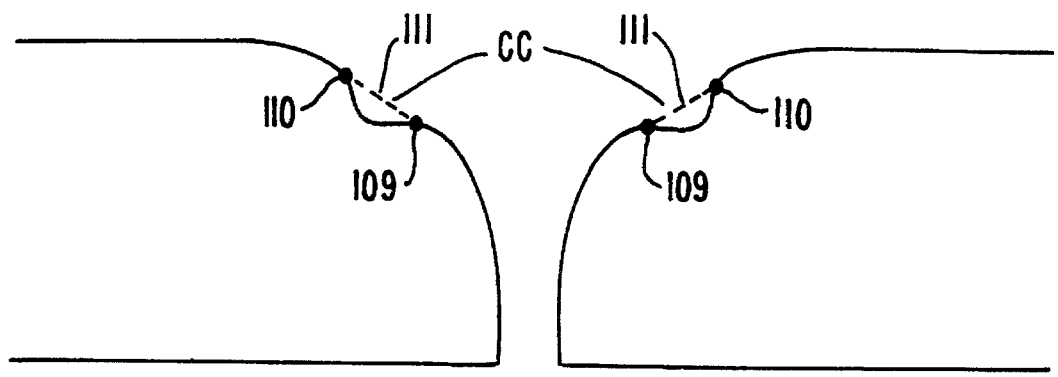
FIG. 19 is a profile of an aperture having an unstable "concave" portion to its profile, this profile possibly being produced by an ablation profile similar to that illustrated for FIG. 18 with the secondary maxima extending above the ablation threshold.
Figure 20:
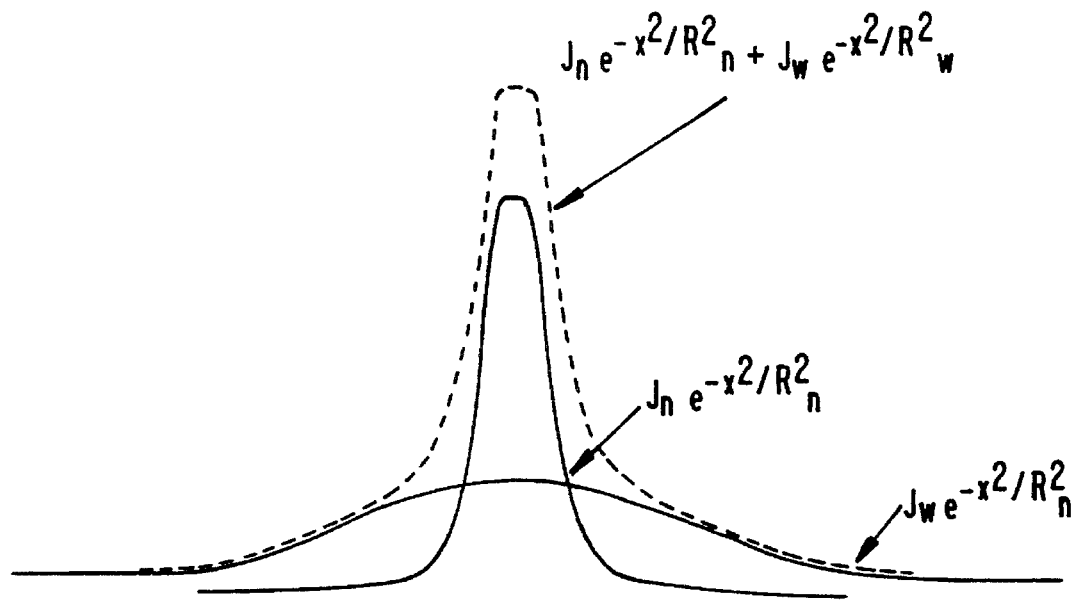
FIG. 20 illustrates a fluence profile which is the sum of two Gaussian fluence profiles.

This can be contrasted with the example shown in FIG. 19. Specifically, the wall shape there shown has a portion with a reversed slope found between inflection points 110 and inflection point 109 of the illustrated profile. It can be seen that broken straight line 111 connecting the respective inflection point 109 and inflection point 110 extends outside ablated material. This opening therefore is not convex.

We now discuss in detail the determination of the fluence profile required to produce a desired opening shape. This technique requires that the substrate be known and have a fluence threshold $J_{th}$. Furthermore, its complex index of refraction,ñ, must be known. $J_{th}$, ñ, both depend on the wavelength of the ablating light. Examples of substrates which cleanly ablate and have fluence thresholds are polyimide, benzocyclobutene (BBQ), polyphenylquinoxalines (PPQ's), polymethylmethacrylate (PMMA), and other polymers. In addition to polymer materials, this invention can be practiced on any other substrate which has a fluence threshold for ablation and significantly ablates above the fluence threshold. As described below, the technique applies to 1 dimensional linear or cylindrically symmetric wall profiles created with unpolarized incident light. The generalization to arbitrary wall profiles and polarized incident light is straightforward but tedious and will not be explicitly given here but can readily be derived based on the considerations discussed herein.

In the following specification, we are going to set forth, utilizing the convenience of mathematical equations, a way to predict the profiles. Before this is done, we outline herewith the steps that can be utilized in obtaining openings having designed profiles.

First, the profile of the opening is selected. Where the profile is convex, it will be possible to develop a fluence profile that at the end of a predictable number of individual laser shots will give the selected hole and further shots will not significantly affect the size or shape of the opening. Alternately, the selected hole can include a concave portion. If this is done, the total number of laser shots will have to be carefully monitored. The laser dosage will have to cease at that time the profile reaches the desired and selected hole shape.

The material of the substrate will have to be selected. Further, a light source of known spectral composition will have to be utilized. Normally this light source will be temporarily coherent—but it can be polychromatic.

Once this is done, it then becomes necessary to determine complex refractive index of the substrate for the light source.

Having chosen the substrate and light source, the ablation threshold can be determined as well as the rate at which etching occurs at fluences above the ablation threshold.

Thereafter, the particular profile of the working image can be determined as it relates to incident fluence on the substrate.

Stopping here, and considering the case of the convex wall profiles of openings in substrates, it is important to realize that our discovery that some profiles can be stably formed is important. By the selection of aperture wall profiles of the described convex character, wide latitude in dose tolerance is achieved after the convex wall profiled aperture is attained. This will impart high accuracy and reproducibility resulting in high production yields to any ablation process utilizing such apertures. Hence the term "stable" is sometimes applied to these wall profiles.

We now proceed to a mathematical enablement of these steps set forth above.

Definition of Symbols

In the foregoing, the following symbols take on the following meanings;

J(x)=fluence profile creating the desired opening shape as a function of position, x, this function is to be determined by the analysis.

D*(x)=desired depth profile as function of position x.

D(x,n)=depth profile after n shots, D(x,0)=0.

$$\tan\theta = \left|\frac{dD}{dx}\right| = \text{the local wall angle.}$$

R(cosθ)=polarization averaged Fresnel Reflectivity, depends on the complex refractive index, ñ.

$$T(\cos\theta) = \cos\theta\frac{1-R(\cos\theta)}{1-R(1)} = \text{effective transmission}$$

coefficient (into material at normal incidence).

Ė[J]=etch rate at fluence J.

Near the fluence threshold we have $$\approx c\left(\frac{J}{J_{th}} - 1\right) \quad J > J_{th}$$
$$0 \quad J < J_{th}$$

and in polyimide at 248 nm the constants c and Jth are approximately.

$c = 0.0623$ μm $J_{th} = 0.027 J/cm^2$.

$J_{th}$ = threshold fluence.

$\hat{n}$ = complex refractive index, $\hat{n} \approx 1.5 + 0.4i$ in polyimide @248 nm.

Assuming a convex opening, given some fluence profile $J(x)$, the depth profile evolves shot by shot according to the following differential-difference equation:

$$D(x,n) = \frac{E[T(\cos\theta)J(x)]}{\cos\theta} + D(x, n-1) \quad (1)$$

$$\tan\theta = \left|\frac{\partial D(x, n-1)}{\partial x}\right|. \quad (2)$$

These equations can be combined to give;

$$D(x,n) = \quad (3)$$

$$D(x, n-1) + \frac{\dot{E}\left[J(x)T\left(\cos\tan^{-1}\left|\frac{\partial D(x,n-1)}{\partial x}\right|\right)\right]}{\cos\tan^{-1}\left|\frac{\partial D(x,n-1)}{\partial x}\right|}.$$

Figure 16:
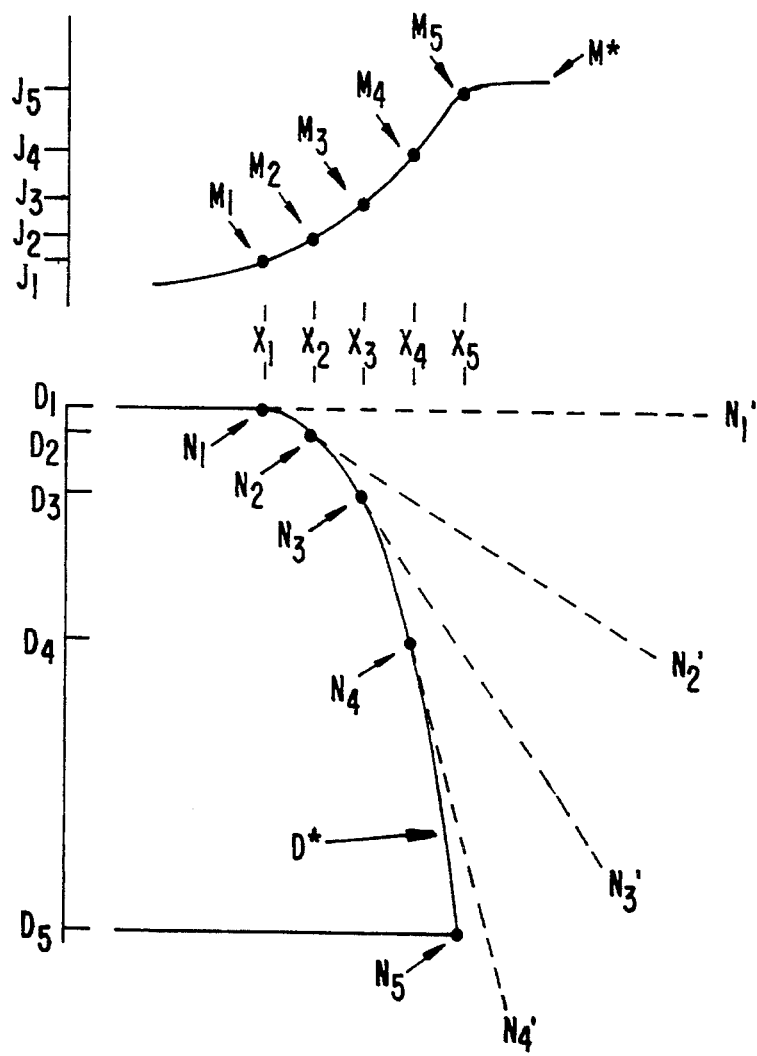
FIG. 16 is a plot of successive laser pulses ablating material with the result of a convex profile being formed.

These equations describe the evolution of the depth profile from shot n–1 to shot n. The fluence profile is determined as a cubic spline which is continuous and has continuous first derivatives. The spline coefficients as well as the mesh point locations are determined from the calculation. Referring to FIG. 16, desired depth profile D* is created by fluence profile M*.

The pulse by pulse evolution of D* is as follows. Initially the surface $N_1$–$N'_1$ is flat. Then, after the first shot it takes on the form $N_1$–$N_2$–$N'_2$. Position x1 denotes the edge of the opening, as such the fluence applied at this point is equal to $J_{th} = J_1$. The fluence is increasing at point M1 so that after 1 shot, the depth profile is the curve $N_1$–$N_2$–$N'_2$. At point $N_2$, the slope of the depth profile is such that even though the fluence profile has increased to the value $J_2 > J_1$, further shots will not further erode $N_2$. $J(x)$ is expressed as a cubic spline in the interval x1 to x2 as;

$$J(x) = J_1 + \dot{J}_1(x - x_1) + \ddot{J}_1\frac{(x - x_1)^2}{2} + \dddot{J}_1\frac{(x - x_1)^3}{6} \quad (4)$$

where the various coefficients can be solved for to get;

$$J_1 = J_{th} \quad (5)$$

$$\dot{J}_1 = \frac{\dot{D}^*}{\frac{\partial \dot{E}}{\partial J}\bigg|_{J_1}}$$

$$\ddot{J}_1 = \frac{\ddot{D}^*}{\frac{\partial^2 \dot{E}}{\partial J^2}\bigg|_{J_1}}$$

$$\dddot{J}_1 = \frac{\dddot{D}^*}{\frac{\partial^3 \dot{E}}{\partial J^3}\bigg|_{J_1}}$$

where $\dot{D}^*$, $\ddot{D}^*$, $\dddot{D}^*$ are the 1st, 2nd and 3rd derivatives of the desired depth profile evaluated at position x1 with equations (5) yielding the rates of change of the fluence profiles necessary to obtain the desired shapes. The point at which this spline interval for J(x) ends is determined by the condition that its endpoint has an effective fluence equal to the threshold fluence $J_{th}$. As an equation this is $$T\left(\cos\tan^{-1}\left|\frac{\partial D(x,1)}{\partial x}\right|\right)\left(J_1 + \dot{J}_1(x-x_1) + \ddot{J}_1\frac{(x-x_1)^2}{2} + \dddot{J}_1\frac{(x-x_1)^3}{6}\right)\bigg|_{x=x_2} = J_{th} \quad (6)$$

Having determined J(x) in the interval x1–x2, we now proceed to the next interval. To keep the discussion in general, we describe how this solution process works in determining the fluence profile in the interval $x_{n-1}$–$x_n$. The fluence profile, J(x), is described in the aforementioned interval by a cubic spline:

$$J(x) = J_n + \dot{J}_n(x - x_n) + \ddot{J}_n\frac{(x - x_n)^2}{2} + \dddot{J}_n\frac{(x - x_n)^3}{6} \quad (7)$$

where the quantities are determined by continuity from:

$$J_n = J_{n-1} + \quad (8)$$

$$\dot{J}_{n-1}(x_n - x_{n-1}) + \ddot{J}_{n-1}\frac{(x_n - x_{n-1})^2}{2} + \dddot{J}_{n-1}\frac{(x_n - x_{n-1})^3}{6}$$

$$\dot{J}_n = \dot{J}_{n-1} + \ddot{J}_{n-1}(x_n - x_{n-1}) + \dddot{J}_{n-1}\frac{(x_n - x_{n-1})^2}{2} \quad (9)$$

and $\ddot{J}_n$, $\dddot{J}_n$ are to be determined.

The depth profile in this interval is described by a quadratic spline $$D(x,n) = D_n + \dot{D}_n(x - x_n) + \ddot{D}_n\frac{(x - x_n)^2}{2} \quad (10)$$

where the quantities $D_n$, $\dot{D}_n$ are determined by continuity through first derivatives as $$D_n = D_{n-1} + \dot{D}_{n-1}(x_n - x_{n-1}) + \ddot{D}_{n-1}\frac{(x_n - x_{n-1})^2}{2} \quad (11)$$

and the second derivative is determined by the corresponding second derivative of the desired profile as:

$$\ddot{D}_n = \frac{\partial^2 D^*(x)}{\partial x^2}\bigg|_{x=x_n} \quad (13)$$

What remains to be determined are the quadratic and cubic coefficients $\ddot{J}_n$, $\dddot{J}_n$. This is done by assuming values for them and then computing $D(x,n)$ by recursive application of eq. 3 and subsequently fitting $D(x,n)$ to a quadratic function;

$$D(x,n) = D_n + A_n(\ddot{J}_n, \dddot{J}_n)(x - x_n) + B_n(\ddot{J}_n, \dddot{J}_n)\frac{(x-x_n)^2}{2} \quad (14)$$

$\ddot{J}_n$, $\dddot{J}_n$ are then determined by solution of the set of simultaneous equations:

$$\dot{D}_n = A_n(\ddot{J}_n, \dddot{J}_n) \quad (15)$$

$$\ddot{D}_n = B_n(\ddot{J}_n, \dddot{J}_n) \quad (16)$$

Figure 17:
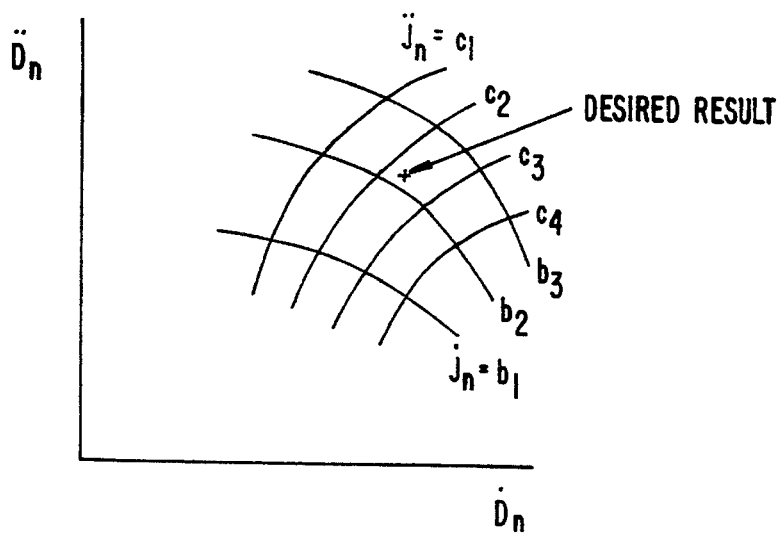
FIG. 17 plots the first and second derivatives of the achieved opening profile as a function of the second and third derivatives of the local fluence profile.

Equations 15 and 16 can be solved by numerical methods such as gradient descent, fisherman's net, or other standard algorithms. FIG. 17 illustrates the fisherman's net algorithm.

The parameters $\ddot{J}_n$, $\dddot{J}_n$ are varied and the results $A_n$, $B_n$ are plotted as in FIG. 17. From the results, the desired solution point can be interpolated or further refined with a finer meshed 'net' of values.

To evaluate the coefficients of equation 14, $D(x,n)$ is calculated at 6 points, $x_n$, $x_a$, $x_b$, and at points incremented from them by a small distance $\epsilon$. The diagram below illustrates the location of these evaluation points. This calculation uses equation 3 iteratively.

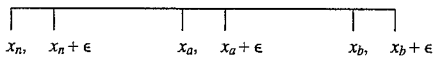

Having determined $\ddot{J}_n$, $\dddot{J}_n$ it remains to determine $X_{n+1}$. This is done by successively incrementing $X_n$ until we satisfy $$T\left(\cos\tan^{-1}\frac{\partial D(x,n)}{\partial x}\right)\left(J_n + \dot{J}_n(x-x_n) + \ddot{J}_n\frac{(x-x_n)^2}{2} + \dddot{J}_n\frac{(x-x_n)^3}{6}\right)\Bigg|_{x=x_{n+1}} = J_{th} \quad (17)$$

Figure 18:
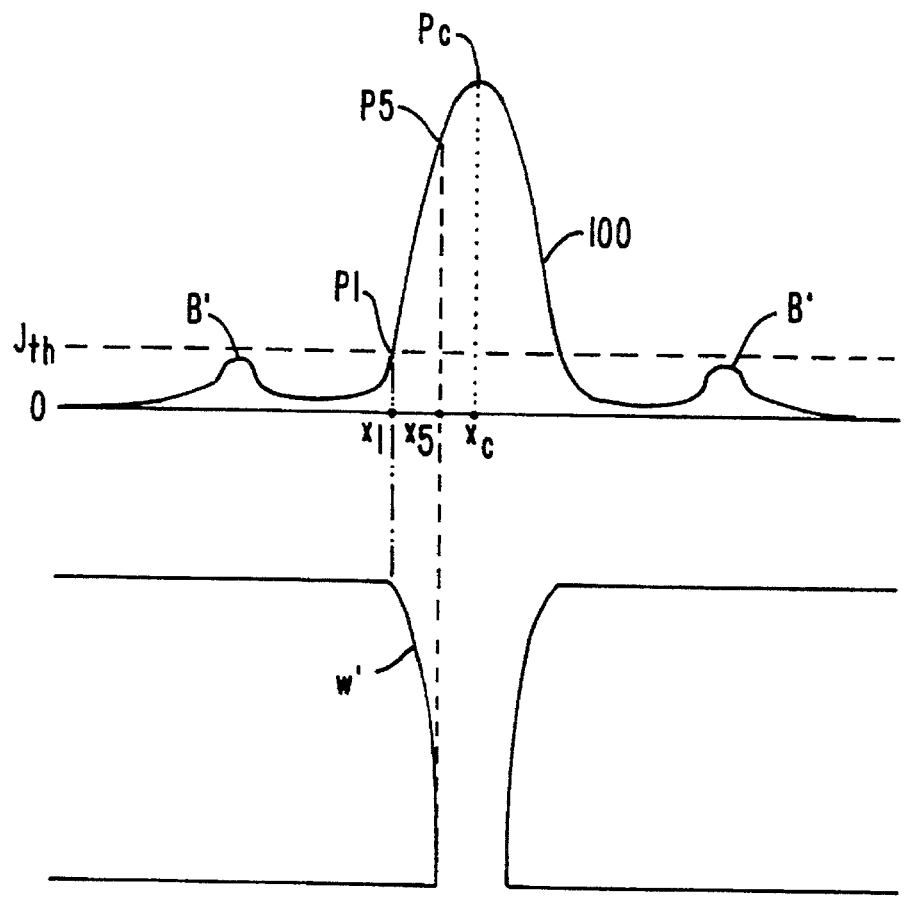
FIG. 18 illustrates a stable convex wall shape and a fluence profile.

Returning to FIG. 16, we can now explain the evolution of the depth profile with increasing shot number. Before the first shot, the depth profile, $N_1$–$N'_1$ is flat. After the first shot it takes the form $N_1$–$N_2$–$N'_2$. Along segment $N_1$–$N_2$ the fluence profile is stable in that subsequent shots do not alter its shape, but segment $N_2$–$N'_2$ is altered by subsequent shots. After the second shot the depth profile is $N_1$–$N_2$–$N_3$–$N'_3$ and the segment $N_1$–$N_2$–$N_3$ is stable with segment $N_2$–$N_3$ being formed by this shot. This process is repeated until the desired depth profile has been determined in a finite number of shots. The resulting profile is immune to change by subsequent laser shots; hence the use of the term stable. To the left of point N, the fluence profile is chosen so that it is continuous through 1st derivatives but is otherwise chosen so it rapidly decreases to 0. Since in this region the incident fluence will be below threshold, its exact form is not critical; however consideration of the effects of fluctuations in the overall fluence level might further constrain the profile in this regime; in particular, convexity of the fluence profile is desirable in the vicinity of $N_1$ but further away, this need not hold. Since the part on the mask (phase mask or imaging mask) responsible for producing the desired fluence profile generally has finite support, (the region responsible for forming the fluence profile extends only over a limited part of the mask) the resulting fluence profile generally extends over a theoretically infinite area on the workpiece. Sidelobe structure of the incident fluence profile is a typical characteristic of such finite support imagery. While the magnitude and extent of the sidelobes can be reduced or largely eliminated with such techniques as phase shifting for imaging masks (for a general review see "The Attenuated Phase-Shifting Mask", by B. Lin, in *Solid State Technology*, January 1993, pg. 43) or backpropagation for phase masks ("Use of Fresnel Zone Plates for Material Processing", B. MacDonald et al.) this is not always possible, and when it is it always results in more complex masks. However if the mask can be designed to produce the desired fluence profile in the region where it is $>J_{th}$, then the side lobe structures will not affect the ablated profile. This is illustrated by FIG. 18 where fluence profile 100, is determined by the aforementioned method in the region from point $x_1$–$x_5$ (or $P_1$ to $P_5$) where there is a specified wall slope. The region from $x_5$ to $x_c$ (or P5 to Pc) is determined as a single segment of a cubic spline, continuous through 1st derivatives at $P_5$, being convex overall, having vanishing 1st derivative at $x_c$, and having minimum total fluence at point $P_c$. The only constraint on the region to the left of $x_1$ is continuity at $x_1$ through 1st derivatives and that it overall always be less than $J_{th}$. In this case, a finite support region in the mask plane creates this fluence profile; that is why there are side lobes, B', and also why the profile is spread out beyond the confines of the desired wall profile W'. Since the wall profile is symmetric, the right half of the fluence profile is automatically determined.

Physical Limitations and Extensions of the Model

The physical model used in deriving the prescription for a fluence profile assumes that the ablation threshold is very sharp and that absolutely no material removal occurs at fluences below it. As discussed in "Direct Etching of Polymeric Materials Using a XeCl Laser" by J. E. Andrew et al. in *Applied Physics Letters* Vol. 43, No. 8, pg. 717–19 (October 1993), the threshold fluence refers to the threshold for significant ablation only. At fluences below threshold there is some material removal but it is typically small. Thus, in the above mentioned reference, the ablation threshold for polyethylene terephthalate (PET) at a wavelength of 308 nm was measured as 0.17 J/cm$^2$, its ablation rate at 0.05 J/cm$^2$, one third of the threshold fluence, was measured at <0.0001 micron.

Funneling of Light

The above mentioned model neglects the fact that the light reflected off of the wall is incident next on the hole bottom or the opposite wall face. This funneling of light down the length of the bore was previously noticed by B. Braren et al. in "Optical and Photochemical Factors which Influence Etching of Polymers by Ablative Photodecomposition", *Journal Vacuum Science and Technology*, B3 (3), Pg. 913 (1985). This effect is most pronounced at high wall angles (>60°) so the wall profiles generated using the fluence profiles produced using the above techniques will tend to be steeper than desired, however for openings created at depth:diameter ratios <2:1, the above mentioned technique should be sufficiently accurate. At greater depth:diameter ratios, the procedure above can be modified to take the reflected light into account. This complicates the calculations since the reflected light is now polarized and the state of polarization influences the surface reflectivity, but this is required at larger depth:diameter ratios if accurate profiles are desired.

Polarized Light

So far we have considered only openings generated using unpolarized light. Unpolarized incident light is of greatest practical importance when the desired openings are circular since in combination with circularly symmetric ablation profiles it leads to circular openings. Polarized light can also be used for creating openings. The simplest configurations are long trenches having a constant desired wall profile. Some effects of polarization on wall slope in this geometry have been observed in the context of chemically assisted laser etching of semiconductor materials by G. Treyz. et al. in "Rapid Direct Writing of High-Aspect Ratio Trenches in Silicon: Process Physics" in *Journal Vacuum Science and Technology* B 6(1), pg. 37. The adaptation of the above technique would involve only changing the Fresnel reflection coefficients $R(\cos(\theta))$ to correspond to the light's incident polarization state.

Non symmetric holes

The methods described above apply explicitly to 1-dimensional profiles, trenches or cylindrically symmetric openings. Generalization to 2 dimensional profiles requires that the quadratic and cubic splines be recast as 2-dimensional finite element structures and the subsequent calculations be carried out accordingly.

Constant Energy and Shape of Profile

The above considerations assume that the overall fluence level is constant from shot to shot. In practice it will vary over some range, the effect on wall shape can be modeled using Monte Carlo techniques, and the limits set on the allowable statistical variation in incident fluence, for producing desired wall profiles.

Unstable Profiles

So far we have been concerned with generating wall profiles which after a certain period of irradiation during which time they are formed and are unaffected by subsequent irradiation. This stability of wall profile is necessary for situations (such as in loosely regulated scanning of a phase or imaging mask) where the number of shots delivered to any given opening is somewhat unpredictable or falls within a range of values. There are, however, situations where the number of shots delivered to each opening is tightly controlled. One example is projection imaging arrangements where the light is incident on the entire region of interest on the imaging mask is simultaneous, hence controlling the number of shots is trivial. Another example is a phase mask designed so that it consists of discrete regions which are scanned separately, and during the course of each scanning step, the entire region is always illuminated. Under these circumstances, and others, unstable as well as stable wall profiles can be patterned.

An unstable wall profile is one that changes with subsequent shots. In general, any profile with concave wall slope is unstable. Thus, in the wall profile of FIG. 19, the portion of the profile between points 109 and 110 are concave and hence will change with further laser shots. This wall profile could be generated by the fluence profile of FIG. 18 in a definite number of shots if the overall fluence level is raised until the fluence on side lobes B' are above the threshold fluence. Another technique for creating the wall profile of FIG. 19 would be to use the fluence profile of FIG. 18 at a higher overall level so that concave portions CC are formed and then switch the overall fluence level so that the concave portions CC are not further ablated and the exit hole portion is stably formed.

Another technique for determining the fluence profile and number of shots required to generate a desired unstable profile is variation of parameters. This technique involves parametrically defining a class of fluence profiles and then varying those parameters and the number of shots until the desired wall shape is found. Standard numerical techniques such as gradient descent can be used to determine the best parameter set. An example of a parametrically determined fluence profile is FIG. 12. A narrow Gaussian $J_n e^{-x^2/r_n^2}$, and a wide Gaussian, $J_w e^{-x^2/r_w^2}$, are added together to form a composite fluence profile. The parameters varied are the fluence coefficients, $J_w$, $J_n$ and the two widths, $r_w$, $r_n$.

Technique for use with polychromatic light

Figure 21:
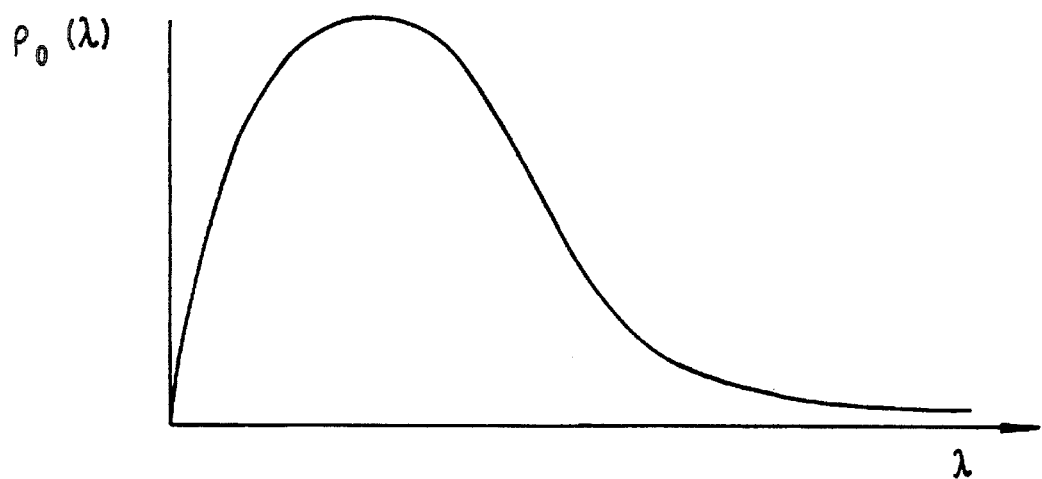
FIG. 21 illustrates the spectral characteristics of a light source used in the apparatus for creating the desired nozzle openings.

So far we have discussed the method of designing the fluence profile as it would be applied to light with a definite wavelength $\lambda$. The method, however, can also be used with more general polychromatic sources. FIG. 21 illustrates a polychromatic spectrum, in this case a blackbody spectrum. $\rho_0(\lambda) \, d\lambda$ is proportional to the amount of energy in the spectrum between $\lambda$ and $\lambda+d\lambda$ and the normalization is $1 = \int \rho_0(\lambda) d\lambda$. Typically, the raw source output spectrum would have its spectral range restricted for ease of optical handling. Next, the ablation rate in the substrate of interest would be determined by experiment, the result being expressed as an ablation rate, $\dot{E}(J)$, at fluence J, at normal incidence to the substrate. Knowing $\dot{E}(J)$ implies knowledge of the threshold fluence $J_{th}$. Then either the complex refractive index, $\tilde{n}(\lambda)$, would be determined as a function of wavelength over the spectral range of the source, or the Fresnel reflection coefficients would be measured as a function of incident angle and polarization using the intended source. If the latter method is used, we immediately know the effective Fresnel reflection coefficients $R(\cos(\theta))$ while if the former method is used, the effective Fresnel reflections can be computed via;

$$R(\cos(\theta)) \rightarrow \int d\lambda \rho_0(\lambda) R(\cos(\theta), n(\lambda))$$

where $$R(\cos(\theta), n(\lambda))$$

is the monochromatic Fresnel reflection coefficient at wavelength $\lambda$. One additional fact is that if light funneling is significant and the contribution of once or multiply reflected light must be taken into account, then not only the polarization but the spectral characteristics of the reflected light will differ from the incident light so that this must be taken into account. However, armed with a suitable characterization of both light source and material, fluence profiles which create desired wall slopes can be determined.

Figure 11:
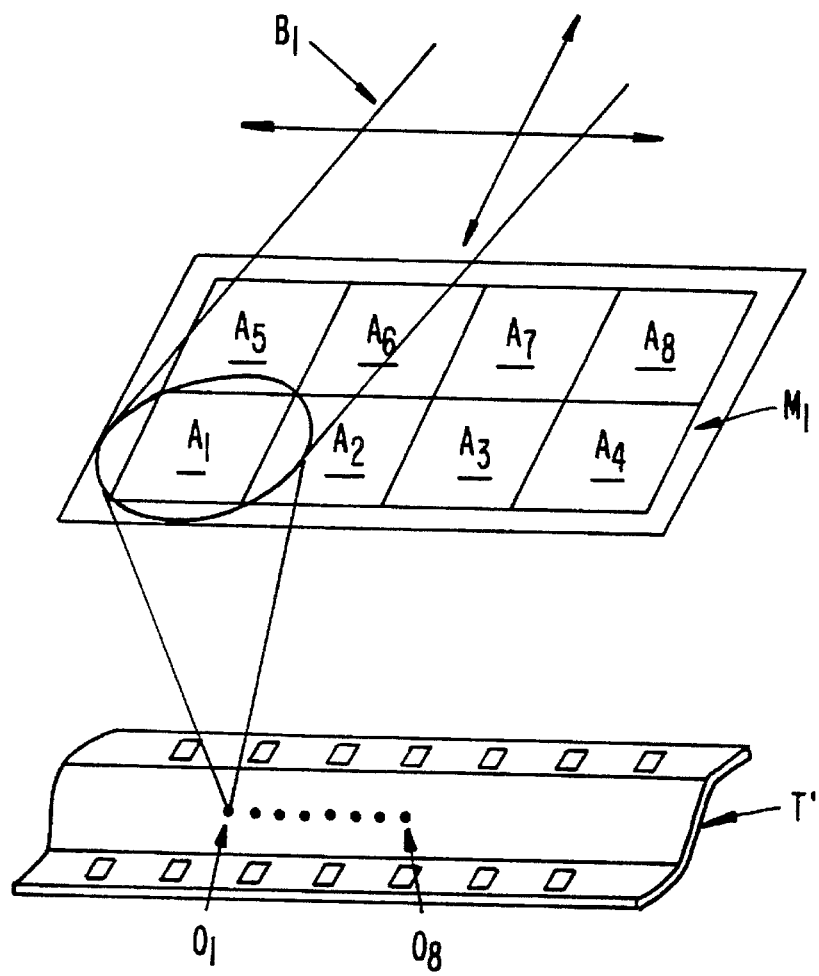
FIG. 11 is an schematic expanded view of one of the masks illustrating a mask with subapertures ablating openings in an underlying substrate, each of the subapertures containing computer generated holograms for forming ablating working images on the substrate when scanned by a laser beam.

Referring to FIG. 11, the function of the apparatus and method of FIG. 2 can be understood. Collimated beam $B_1$ has been divided out from the original collimated beam from KrF excimer laser $L_1$. Mask $M_1$ contains a plurality of subapertures $A_1$–$A_8$. These respective subapertures when sequentially scanned by collimated beam $B_1$ produce successive working images to ablate openings $O_1$–$O_8$ in substrate T'.

We refer herein to the ability to adjust the intensity of an image profile with precision. Such adjustment is set forth in our co-pending application entitled USE OF FRESNEL ZONE PLATES FOR MATERIAL PROCESSING filed Jan. 3, 1994, this application being a Continuation-in-Part of Ser. No. 07/940,008 filed Sep. 3, 1992, which was a File Wrapper Continuation of Ser. No. 07/612,212 filed Nov. 9, 1990, now abandoned. This application is incorporated herein by reference.

Specifically, in that disclosure, we include two techniques for controlling image intensity in a holographic image with precision. The first of these techniques is feature width modulation. By utilizing two or more differing levels of optical elements and by varying the feature width substantially parallel to the grating period, image intensity or amplitude can be precisely controlled.

In a related portion of that application under the title of "chirping", we disclose a technique for the random interruption of grating fringes along their respective lengths. This random interruption uses a probability that again can control with relative precision the desired image amplitude.

The invention has been described in terms of a preferred embodiment. The invention, however, is not limited to the embodiment depicted and described. Rather, the scope of the invention is defined by the appended claims.

What is claimed is:

1. In a laser ablation system having,
   a laser emitting a plurality of pulsed beams of controlled intensity for ablation of a work piece;
   means for holding a work piece having a known ablation threshold and rate of ablation above said threshold for incidence of said pulsed beams to ablate a portion of said work piece;
   means for causing incidence of said pulsed beams at said work piece from said laser to produce ablation of an opening of specific shape at said work piece; the improvement comprising:
   a laser beam sensing subsystem for diverting a fraction of said laser beam and analyzing said beam in pointing, coherence, phase and irradiance profile;
   means for collimation and pointing of said laser beam responsive to said laser beam sensing subsystem measured pointing, coherence, and phase;
   means for predicting the pulses of controlled intensity required to ablate said opening of specific shape at said work piece responsive to said coherence, phase, and irradiance profile of said laser beam through said means for incidence; and,
   means for controlling said laser to emit said pulses of controlled intensity to ablate said opening of specific shape on said work piece.

2. In a laser ablation system of claim 1 and further including:
   said laser beam sensing subsystem for diverting a fraction of said laser beam and analyzing said beam in coherence, phase and irradiance profile further includes;
   at least one beam splitter for re-directing a portion of said laser beam;
   a first detector for measuring the pointing of said laser beam; and,
   a second detector including a beam analyzer with a lens matrix for focusing light in discrete segments from said laser beam and a detector array for measuring the intensity and wavefront properties of said beam.

3. In a laser ablation system of claim 1 and further including:
   said means for collimation and pointing of said laser beam responsive to said laser beam sensing subsystem includes;
   a mirror with active adjustment in two degrees of freedom to adjust measured pointing of said beam; and,
   a telescope with adjustable focus for active control of said collimation of said beam.

4. In a laser ablation system of claim 1 and further including:
   means for measuring said feature of specific shape on said work piece;
   means for comparing said measured feature of specific shape to said feature of specific shape; and,
   means for altering the output of said pulses of controlled intensity to produce a second ablation on said work piece to produce said opening of said specific shape.

5. In a laser ablation system of claim 1 and further including:
   said means for measuring said feature of specific shape on said work piece includes;
   at least one sensor array for imaging said ablated feature of specific shape on said work piece;
   means for moving said work piece relative to said array to measure said feature of specific shape on said work piece.

6. In a laser ablation system of claim 1 and further including:
   said means for causing incidence includes a phase plate having holograms and subapertures.

7. In a process for laser ablation including the steps of:
   providing a laser for emitting a plurality of pulsed beams of controlled intensity from said laser for ablation of a work piece;
   holding a work piece having a known ablation threshold and rate of ablation above said threshold for incidence of said pulsed beams of controlled intensity to ablate a portion of said work piece;
   causing incidence of said pulsed beams of controlled intensity at said work piece from said laser to produce ablation of an opening of specific shape at said work piece; the improvement to said ablation process comprising the steps of:
   providing a laser beam sensing subsystem for diverting a fraction of said laser beam;
   analyzing said diverted beam in pointing, coherence, phase and irradiance profile;
   collimation and pointing said laser beam responsive to said laser beam sensing subsystem measured pointing, coherence, and phase; and,
   predicting the pulses of controlled intensity required to ablate said opening of specific shape at said work piece responsive to said coherence, phase, and irradiance profile of said laser beam through said means for incidence; and,
   pulsing said laser at said controlled intensity for ablating said opening of specific shape on said work piece.

8. In a process for laser ablation according to claim 7 and including the further steps of:
   providing at least one beam splitter for redirecting a portion of said laser beam;
   providing a first detector for measuring the pointing of said laser beam; and,
   providing a second detector including a beam analyzer with a lens matrix for focusing light in discrete segments from said laser beam and a detector array for measuring the intensity and wavefront properties of said beam.

9. In a process for laser ablation according to claim 8 and including the further steps of:
   said collimation and pointing steps include
   providing a mirror with active adjustment in two degrees of freedom to adjust measured pointing of said beam;

adjusting the pointing of said beam by moving said mirror;

providing a telescope with adjustable focus for active control of said collimation of said beam; and, adjusting said telescope to collimate said beam.

10. In a process for laser ablation according to claim 7 and including the further steps of:

measuring said feature of specific shape on said work piece after said work piece is ablated with said feature of specific shape;

comparing said measured feature of specific shape to said feature of specific shape; and, altering the pulses of controlled intensity to produce said opening of said specific shape.

11. In a process for laser ablation according to claim 10 and including the further steps of:

said measuring said feature of specific shape on said work piece includes;

providing at least one sensor array for imaging said ablated feature of specific shape on said work piece;

moving said work piece relative to said array to measure said feature of specific shape on said work piece.

12. A process of ablating a feature of preselected size and shape on a work piece of known material having an ablation threshold and known rates of ablation above said threshold having the steps of:

providing a laser for emitting pulsed beams of controlled intensity for ablating said feature of preselected size and shape;

providing a transparent substrate having image information for ablating said feature of preselected size and shape;

providing means for scanning said beam over said transparent substrate across said image information for ablating said feature of preselected size and shape;

providing means for controlling said scanning and pulsing;

providing a laser beam sensing subsystem for diverting a fraction of said laser beam;

analyzing said diverted beam in pointing, coherence, phase and irradiance profile;

collimation and pointing said laser beam responsive to said laser beam sensing subsystem measured pointing, coherence, and phase;

predicting the pulses of controlled intensity and scan required to ablate said opening of specific shape at said work piece responsive to said coherence, phase, and irradiance profile of said laser beam through said means for incidence; and, pulsing and scanning said laser to produce said opening of specific shape in said work piece.

13. A process of ablating a feature of preselected size and shape on a work piece of known material having an ablation threshold and known rates of ablation above said threshold according to claim 12 having the further steps of:

measuring said feature of specific shape on said work piece after said work piece is ablated with said feature of specific shape;

comparing said measured feature of specific shape to said feature of specific shape; and, altering said scanning and pulsing to produce said opening of said specific shape on said work piece.

14. A process of ablating a feature of preselected size and shape on a work piece of known material having an ablation threshold and known rates of ablation above said threshold according to claim 13 having the further steps of:

said measuring said feature of specific shape on said work piece includes;

providing at least one sensor array for imaging said ablated feature of specific shape on said work piece;

moving said work piece relative to said array to measure said feature of specific shape on said work piece.

15. In a process for laser ablation including the steps of:

providing a laser for emitting a plurality of pulsed beams of known intensity from said laser for ablation of a work piece;

holding a work piece having a known ablation threshold and rate of ablation above said threshold for incidence of said pulsed beams to ablate a portion of said work piece;

causing incidence of said pulsed beams of known intensity at said work piece from said laser to produce ablation of an opening of specific shape at said work piece; the improvement to said ablation process comprising the steps of:

providing a laser beam sensing subsystem for diverting a fraction of said laser beam;

analyzing said diverted beam in pointing, coherence, phase and irradiance profile;

collimation and pointing said laser beam responsive to said laser beam sensing subsystem measured pointing, coherence, and phase; and, pulsing said laser at said controlled intensity responsive to said analyzed and diverted beam coherence, phase and irradiance profile to produce said opening of specific shape on said work piece.

16. In a process for laser ablation according to claim 15 and including the further steps of:

said step of causing incidence of said pulsed beams of known intensity at said work piece includes scanning said beam.

17. In a process for laser ablation according to claim 15 and including the further steps of:

said step of causing incidence of said pulsed beams of known intensity at said work piece includes pulsing said beam for a selected number of pulses.

18. In a process for laser ablation according to claim 15 and including the further steps of:

said step of causing incidence of said pulse beams of known intensity at said work piece includes changing the intensity of said beam.

* * * * *